(12) United States Patent
Kabel et al.

(10) Patent No.: US 7,516,011 B1
(45) Date of Patent: Apr. 7, 2009

(54) NAVIGATION WITH REAL-TIME WEATHER

(75) Inventors: Darrin W. Kabel, Overland Park, KS (US); Craig L. Mehan, Overland Park, KS (US); Steven J. Myers, Edgerton, KS (US); Michael A. Manna, Olathe, KS (US)

(73) Assignee: Garmin Ltd. (KY)

( * ) Notice: Subject to any disclaimer, the term of this patent is extended or adjusted under 35 U.S.C. 154(b) by 620 days.

(21) Appl. No.: 11/034,654

(22) Filed: Jan. 13, 2005

(51) Int. Cl.
*G01C 21/00* (2006.01)
*G01C 21/26* (2006.01)

(52) U.S. Cl. .................................. 701/211; 340/995.19
(58) Field of Classification Search ........................ None
See application file for complete search history.

(56) References Cited

U.S. PATENT DOCUMENTS

| 5,265,024 | A  | * | 11/1993 | Crabill et al. ............... 701/200 |
| 6,014,606 | A  | * | 1/2000  | Tu .............................. 701/200 |
| 6,356,839 | B1 | * | 3/2002  | Monde et al. ............... 701/210 |
| 6,650,972 | B1 | * | 11/2003 | Robinson et al. ............... 701/3 |
| 6,845,324 | B2 | * | 1/2005  | Smith ............................ 702/3 |
| 6,865,480 | B2 | * | 3/2005  | Wong .......................... 701/210 |
| 6,871,137 | B2 | * | 3/2005  | Scaer et al. .................. 701/200 |
| 7,013,216 | B2 | * | 3/2006  | Walters et al. ............... 701/200 |
| 7,027,898 | B1 | * | 4/2006  | Leger et al. .................... 701/14 |
| 7,081,834 | B2 | * | 7/2006  | Ruokangas et al. ......... 340/945 |
| 7,313,810 | B1 | * | 12/2007 | Bell et al. .................... 725/116 |
| 2003/0233176 | A1 | * | 12/2003 | Cerchione et al. ............. 701/21 |
| 2005/0024236 | A1 | * | 2/2005  | Gosdin et al. ............... 340/905 |
| 2005/0215194 | A1 | * | 9/2005  | Boling et al. .............. 455/3.02 |
| 2006/0022846 | A1 | * | 2/2006  | Tummala .................. 340/995.1 |

FOREIGN PATENT DOCUMENTS

JP   06-201394    *  7/1994
JP   2003-148976  *  5/2003

* cited by examiner

*Primary Examiner*—Michael J. Zanelli
(74) *Attorney, Agent, or Firm*—Samuel M. Korte

(57) ABSTRACT

Real-time weather information is dynamically acquired in real-time and presented within a display. The display also includes a variety of other information, such as a route and a current position associated with a navigation device. The real-time weather information includes real-time weather and/or water conditions. The real-time weather and/or water conditions are presented within the display with unique visual features and concurrently presented with the other information.

5 Claims, 27 Drawing Sheets

NAVIGATION WITH REAL-TIME WEATHER

FIELD

The invention relates to real-time weather and in particular to navigation having real-time weather features.

BACKGROUND

Generally, vehicles, vessels, and aircraft rely on a variety of communication devices to acquire weather information. For example, marine vessels often subscribe to a weather fax service where weather information is transmitted via facsimile to the marine vessels at predefined time intervals. Other techniques include subscribing to satellite radio services; thereby acquiring weather information audibly over a radio receiver. In still other situations, weather is communicated from control towers to pilots of aircrafts.

Real-time weather information can be vitally important when traveling in vehicles, aircrafts, and marine vessels. Moreover, timely delivery of weather information by itself may often not be sufficient to ensure safety. In other words, how weather information is interpreted and comprehended can affect whether a real weather threat is taken seriously or mistook for something innocuous. In addition, there are a variety of weather characteristics that assist in interpreting weather information. Conventional approaches do not present, package, and deliver real-time weather characteristics in manners that are timely and easily comprehended by recipients.

DETAILED DESCRIPTION

Figure 1:
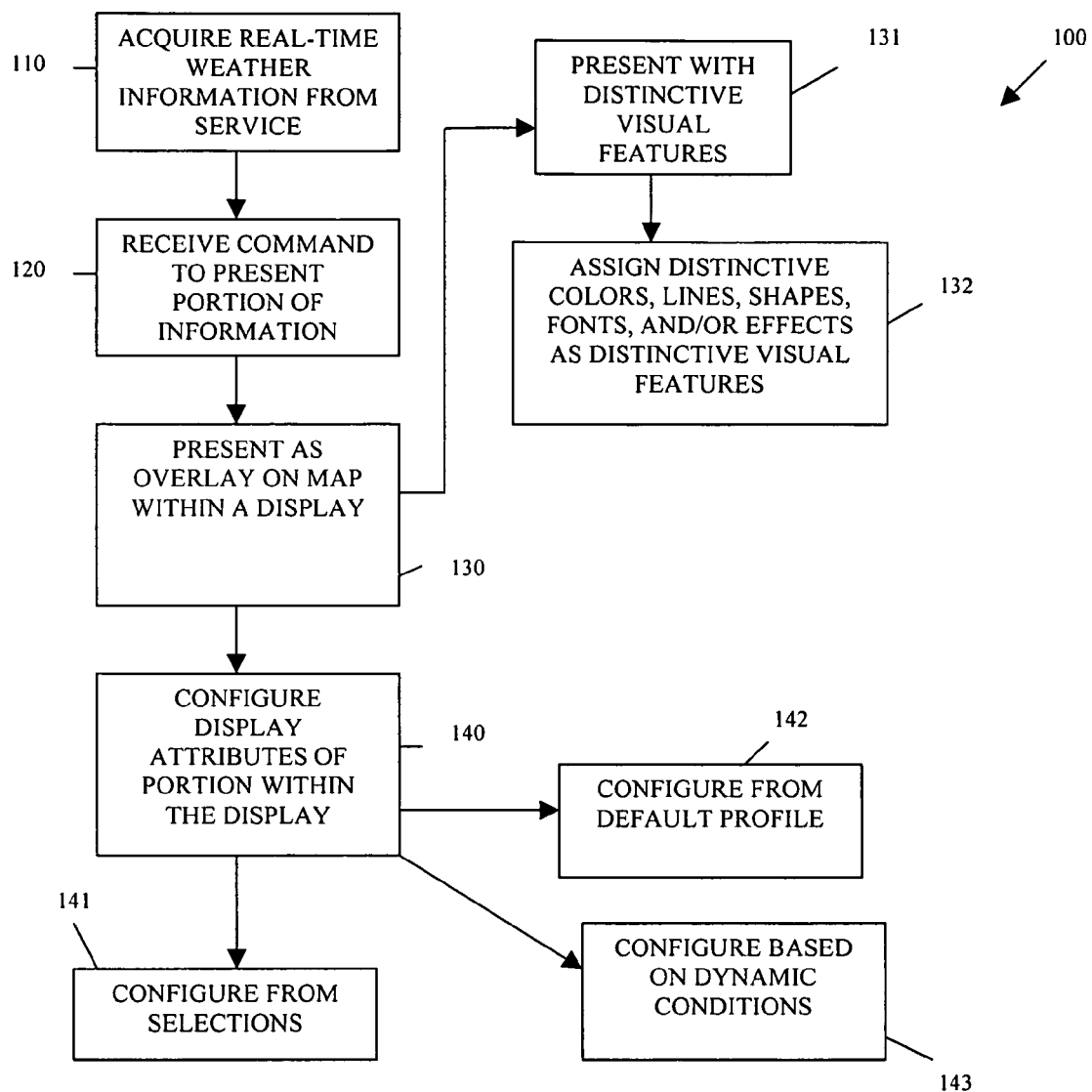
FIG. 1 is a diagram of a method for presenting real-time weather information, according to an example embodiment.

FIG. 1 is a diagram of one method 100 to present real-time weather information, according to an example embodiment. The method 100 (hereinafter "real-time weather interface service") is implemented in a machine-accessible and readable medium and is accessible over a network, where the network is wireless or a combination of hardwired and wireless.

Initially, a real-time weather interface service is loaded and processed on a navigation device. A navigation device is a device that is capable of acquiring current positioning information for itself and capable of providing route guidance from a given start position to a desired position. The navigation device may be a portable and standalone device; or alternatively, the navigation device may be integrated into another device or piece of equipment.

The navigation device is interfaced to a real-time weather service which is available through an entertainment service, such as a satellite radio service, and further interfaced to a positioning system, such as a Global Positioning Satellite (GPS) service. The entertainment service includes a variety of programs delivered via satellite radio accessible on different channels. The programs may relate to music, talk radio programs, business, news, etc. In this sense, the entertainment service may be referred to as "infotainment." The real-time weather interface service communicates with the real-time weather service for purposes of acquiring real-time weather characteristics for given geographic locations.

At 110, the real-time weather interface service acquires real-time weather information from the real-time weather service. The real-time weather information is for a given geographic area. In an embodiment, the geographic area includes a route associated with the navigation device. In another embodiment, the geographic area is associated with a user-selected geographic area, which is different from the route of the navigation device.

The geographic area and the route of the navigation device may be associated with a map that depicts roads, waterways, and/or aircraft routes. That is, cartographic data that represents roads, terrain, waterways, etc. is used to depict the geographic area and the route. Moreover, the navigation device may be integrated or located within a land vehicle, a marine vessel, a spacecraft, and/or an aircraft.

The real-time weather information includes a variety of real-time weather characteristics, such as, but not limited to, temperature, wind speed, wind direction, water temperature, wave periods, wave directions, wave height, barometric pressure, lightening, rain, hail, snow, front information, and others.

At 120, the real-time weather interface service receives a command which requests that at least a portion of the acquired real-time weather information be presented on a display associated with the navigation device. The portion requested represents selective ones of the real-time weather characteristics which comprise the real-time weather information.

In response to the detected command, the real-time weather interface service presents the desired portion of real-time weather information as an overlay on a map within the display. The map also includes cartographic data associated with the route of the navigation device. The portion is overlaid on the map within the display. Various example illustrations of how this may visually appear are presented in FIGS. 10-17, which are discussed in greater detail herein and below.

In an embodiment, at 131, unique real-time weather characteristics and unique pieces of the map data (cartographic data) are presented within the display with unique visual features. Accordingly, at 132, the real-time weather interface service assigns distinctive colors, lines, shapes, fonts, and/or effects as the unique visual features. This permits a plethora of information to be presented within the display of the navigation device without overwhelming a viewer and in such a manner that each different piece of information can be easily discerned and comprehended by the viewer.

In some arrangements, at 140, the real-time weather interface service may associate and dynamically configure a variety of display attributes for the portion of real-time weather information which is presented on the navigation device's display. Display attributes may effect the location, color, shape, size, etc. of weather characteristics as they appear within the display. The display attributes may also effect the units used when presenting the real time weather information (e.g., Fahrenheit versus Celsius, etc.). In an embodiment, at 141, the display attributes may be configured from user selections. Alternatively, at 142, the display attributes may be configured from a default profile associated with the user or the navigation device.

In still another embodiment, at 143, the display attributes may be dynamically configured based on a variety of dynamic conditions. For example, some weather characteristics may be selectively removed or over emphasized within the display when the navigation device's current position is detected as moving away from a storm front or approaching a storm front. As other examples, the state of the display may indicate that some threshold quantity of information being presented within the display has reached a level that is deemed to indicate excessive clutter; in these circumstances the real-time weather interface service may selectively remove some weather characteristics or change their appearance so as to minimize the clutter appearing within the display's presentation. In fact, any display state and/or navigation device state may be predefined and used by the real-time interface service to dynamically alter display attributes associated with the portion of real-time weather information being presented within the display or to dynamically add and/or remove some real-time weather characteristics being presented with the displayed portion of real-time weather information.

Figure 2:
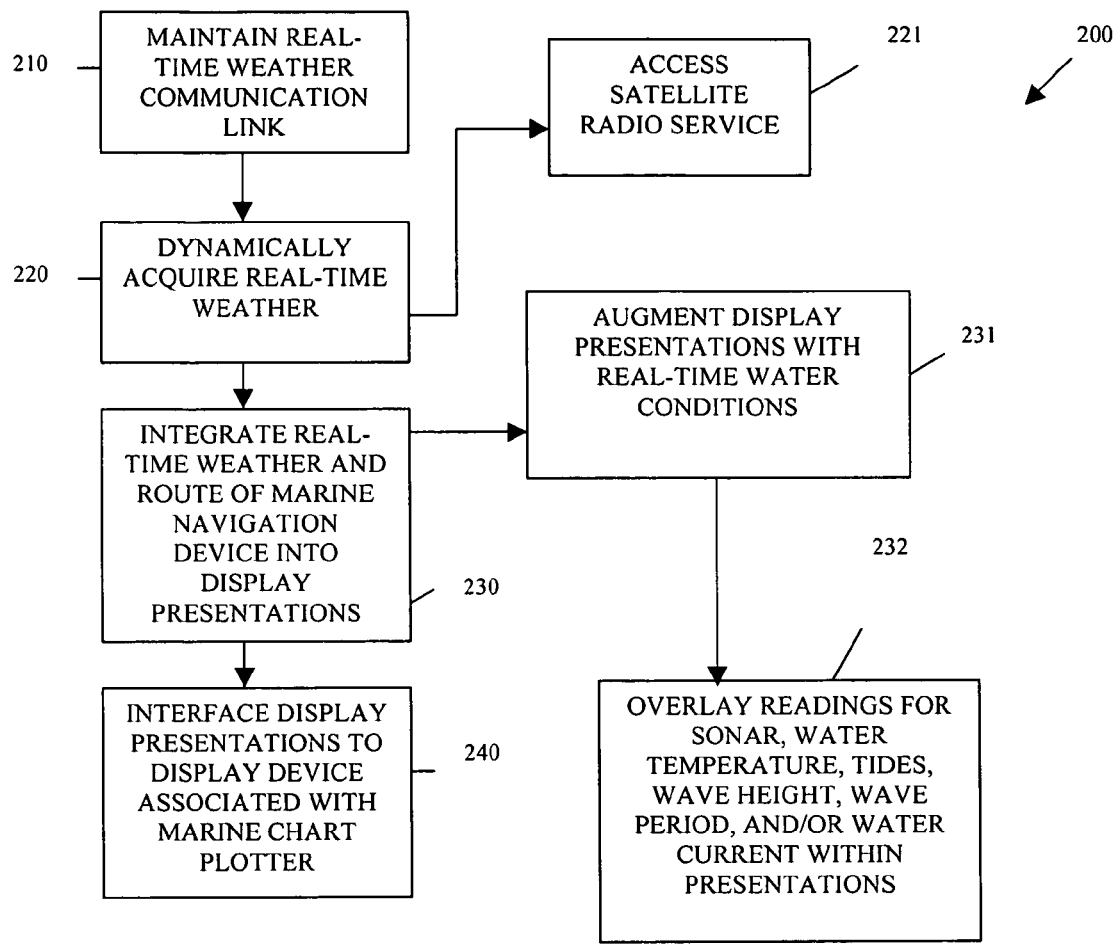
FIG. 2 is a diagram of another method for presenting real-time weather information, according to an example embodiment.

FIG. 2 is a diagram of another method 200 for presenting real-time weather information, according to an example embodiment. The method 200 is implemented in a machine-accessible and readable medium and is accessible over a network. The network may be wireless, hardwired, or combinations of hardwired and wireless.

Initially, a marine navigation device having memory, processor(s), and a display is interfaced with a Global Positioning Satellite (GPS) system and one or more services that deliver information via the GPS system. One such service is a real-time weather service where real-time weather information is delivered via a GPS channel to subscribers of the weather service. The real-time weather information is provided as electronic data and may, in some cases, also be provided as audio and/or video data.

The marine navigation device includes marine cartography and route guidance software. Moreover, the marine navigation device is adapted to receive positioning information from the GPS system via a GPS antenna for purposes of determining dynamic positions associated with a marine vessel with respect to the marine cartography. The marine vessel is equipped with the marine navigation device. A user interacts with the marine navigation device for purposes of interfacing with the route guidance software and generating a planned route of navigation for the marine vessel. A display interfaced to the marine navigation device visually depicts a route within the marine cartography for the traveling marine vessel.

In addition, the marine navigation device uses its GPS antenna to interface with the real-time weather service via a real-time weather link associated with the GPS transmission. Thus, at 210, the processing of the method 200 maintains a real-time weather communication link for dynamically acquiring, at 220, real-time weather information from a real-time weather service. In an embodiment, at 221, the acquisition is made via a satellite radio service that includes the real-time weather service on one or more of its available channels.

At 230, the dynamically acquired real-time weather information is integrated into display presentations associated with the marine navigation device. That is, selective portions of the real-time weather information are overlaid onto the marine cartography and the route within a display, providing real-time and dynamic views of the marine vessel relative to its surroundings and its projected path of travel.

In an embodiment, at 231, the display presentations may be further augmented with real-time water conditions associated with a body of water that is being represented by the marine cartography. The real-time water conditions may include sonar depth readings, water temperature readings, tidal information, wave height readings, wave period readings, water current readings, etc. The real-time water conditions may be, at 232, dynamically overlaid within the display presentations. This provides even more information for the captain of the marine vessel about the environment that surrounds and is in front of his/her marine vessel.

The information (e.g., marine cartography, real-time weather information, route of travel, current position of marine vessel, and/or real-time water conditions) that is dynamically presented within the display may be configured to be presented in manners that permit distinct information to be rapidly detected visually and quickly comprehended and appreciated by the captain or other user of marine navigation device. Thus, distinct portions of the information may be presented within the display using unique, colors, shapes, textures, effects, etc. Moreover, in some embodiments, the colors, shapes, texture, effects, and the like can be configured by a user.

In an embodiment, at 240, the display presentations are interfaced to a display device that is associated with a marine chart plotter. In this manner, the marine navigation device's output may be integrated and displayed on a display associated with a device that sailors are familiar with, such as a chart plotter.

Figure 3:
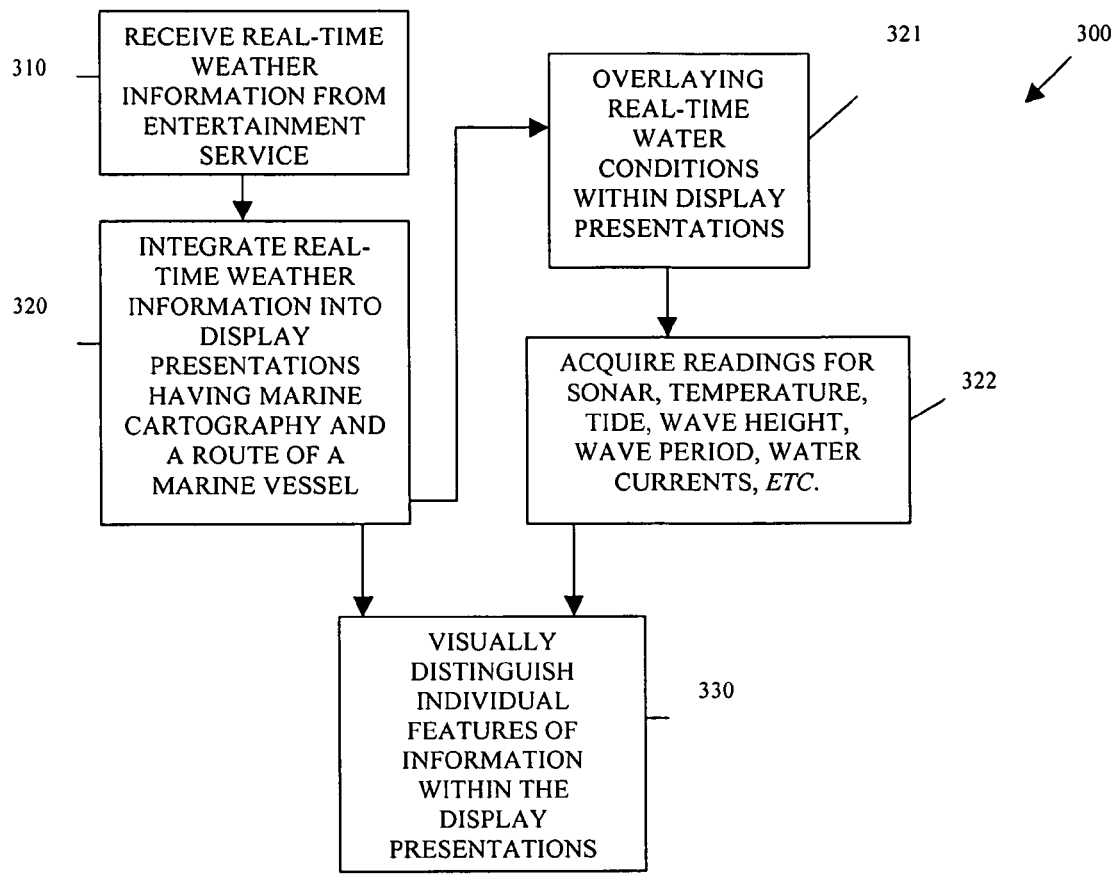
FIG. 3 is a diagram of yet another method for presenting real-time weather information, according to an example embodiment.

FIG. 3 is a diagram of yet another method 300 for presenting real-time weather information, according to an example embodiment. The method 300 is implemented in a machine-accessible and readable medium and is accessible over a network. The network may be wireless, hardwired, and/or combinations of hardwired and wireless.

The processing of the method 300 is implemented within a marine navigation device. The marine navigation device is equipped with one or more wireless antennas for receiving wireless information. The wireless information includes location information for satellites; this location information permits software processing on the marine navigation device to rapidly resolve a current geographical position of a marine vessel that is equipped with the marine navigation device.

The one or more antennas also permit the marine navigation device to receive other information transmitted via satellite. Some of this other information includes real-time weather information for a given geographical area. The marine navigation device may also include a transmitter, such that it is capable of transmitting information wirelessly. The real-time weather information is obtained from a GPS satellite radio transmission that includes entertainment or infotainment (as described above with respect to method 100 of FIG. 1). The specific channel associated with a real-time weather service that is being carried over the infotainment service may be preconfigured or dynamically supplied to the processing of the method 300 of FIG. 3.

Once the marine navigation device is initially configured to determine positioning information for a marine vessel equipped with the marine navigation device and to receive real-time weather information over a specific channel of a GPS infotainment service, the processing of the method 300 takes place in the follow manners.

At 310, real-time weather information is received from the entertainment (infotainment) service. Selective portions of that real-time weather information are integrated into display presentations of a display interfaced to the marine navigation device. The presentations also include marine cartography and a route of travel associated with the moving marine vessel.

In an embodiment, at 321, real-time water conditions are also overlaid within the presentations for a body of water that is being depicted and represented by the marine cartography. This may be achieved by interfacing the marine navigation device with other wireless transmissions associated with water buoys or interfacing the marine navigation device with sensors or other processing devices within the marine vessel that are capturing and recording the real-time water conditions. Furthermore, in some embodiments, the real-time water conditions may be carried on the same or different channel of the real-time weather service over the infotainment service.

In an embodiment, at 322, the marine navigation device acquires the real-time water conditions as sonar depth readings, water temperature readings, tidal information, wave height readings, wave period readings, water current readings, and the like. The real-time water conditions are overlaid within the dynamic presentations being presented within the display, which is interfaced to the marine navigation device.

The real-time weather information, marine cartography, route of travel, and real-time water conditions may each include their own unique individual features of information. At 330, each of these unique features may be distinguished uniquely with the display presentation using a variety of configurable colors, shapes, textures, and/or effects. In this manner, a captain or user of the method 300 can rapidly ascertain and digest a plethora of information associated with the external environment and surroundings of a traveling marine vessel. This enables improved navigation decisions and improved navigation planning for the marine vessel and its passengers and/or cargo.

Figure 4:
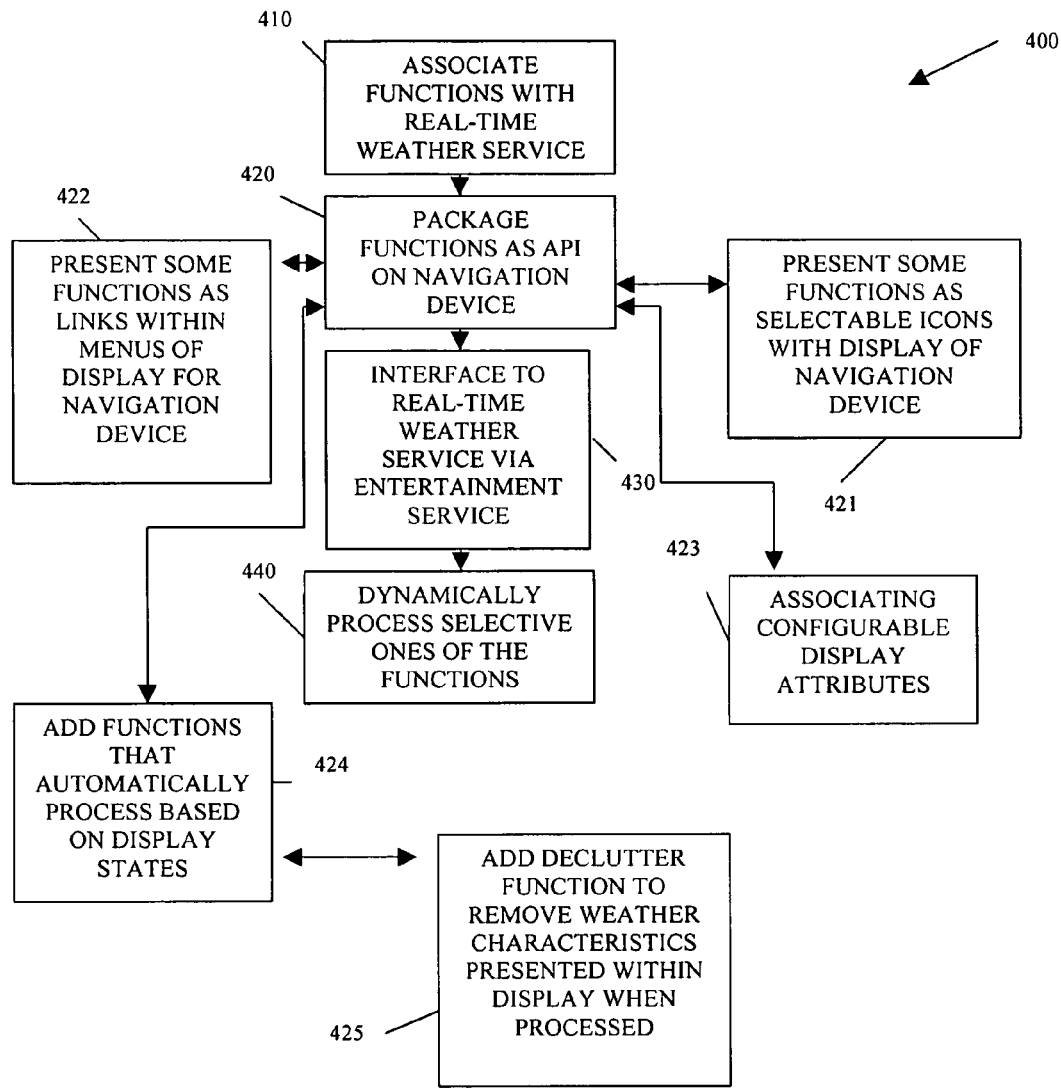
FIG. 4 is a diagram of method for processing real-time weather information, according to an example embodiment.

FIG. 4 is a diagram of method 400 for processing real-time weather information, according to an example embodiment. The method 400 is implemented within a machine-accessible and readable medium and is accessible over a network. In an embodiment, the method 400 is implemented as an Application Programming Interface (API) suite of functions within a navigation device.

Initially, a variety of functions are developed and designed to interface with a real-time weather service via a real-time entertainment service. The real-time weather service provides real-time weather characteristics and real-time water conditions. At 410, these functions are properly identified and associated with their corresponding real-time weather characteristics, such that each different weather characteristic or a selective grouping of weather characteristics are associated with a different one of the functions.

At 420, the functions are packaged as an API within a navigation device. The API and the corresponding functions are called, loaded, and processed on the navigation device.

In an embodiment, at 421, some functions within the API are presented as selectable icons within display presentations of the navigation device during operation of the navigation device. Thus, a user or viewer may execute some functions of the API by selecting the icons that appear within the display of the navigation device.

In another embodiment, at 422, some functions are presented as links within menus of the display presentations. That is, some display presentations may include a variety of menus, when these menus are selected some of the real-time weather functions associated with the API may be selected and processed from those menus.

In still more embodiments, at 423, some functions may include configurable display attributes that may be customized by a user of the navigation device. The display attributes alter the location and appearance of real-time weather characteristics which are acquired from the API functions from a real-time weather service. In some cases, predefined preferences or profiles may be used to automatically configure the display attributes.

In yet another embodiment, at 424, some functions may be added and implemented to automatically process based on existing and currently detected display presentation states. For example, at 425, a declutter function may be added to the API and when processed it may remove certain predefined weather characteristics which are being presented within the display when a predefined quantity or density of information is reached or when a predefined state associated with the real-time weather information or the position of the navigation device is detected.

During operation, at 430, the API is interfaced over a network to a real-time weather service for purposes of acquiring real-time weather characteristics for a given geographic space that surrounds a current position of the navigation device and surrounds a navigation route associated with the navigation device. As operation continues, the navigation device interfaces with a positioning service and the current position of the device is altered along its route. Moreover, selective ones of the API functions are dynamically processed and selected, at 440, based on states of the device, states of the route, states of the current position, states of the presentation within the display, and/or based on dynamic selections being made by a user interfaced to the navigation device.

The display attributes and the API functions cooperate to present real-time weather characteristics and cartographic data associated with a map using unique visual features and arrangements. Some examples of these unique features and arrangements are presented herein and below with FIGS. 12-19.

Figure 5:
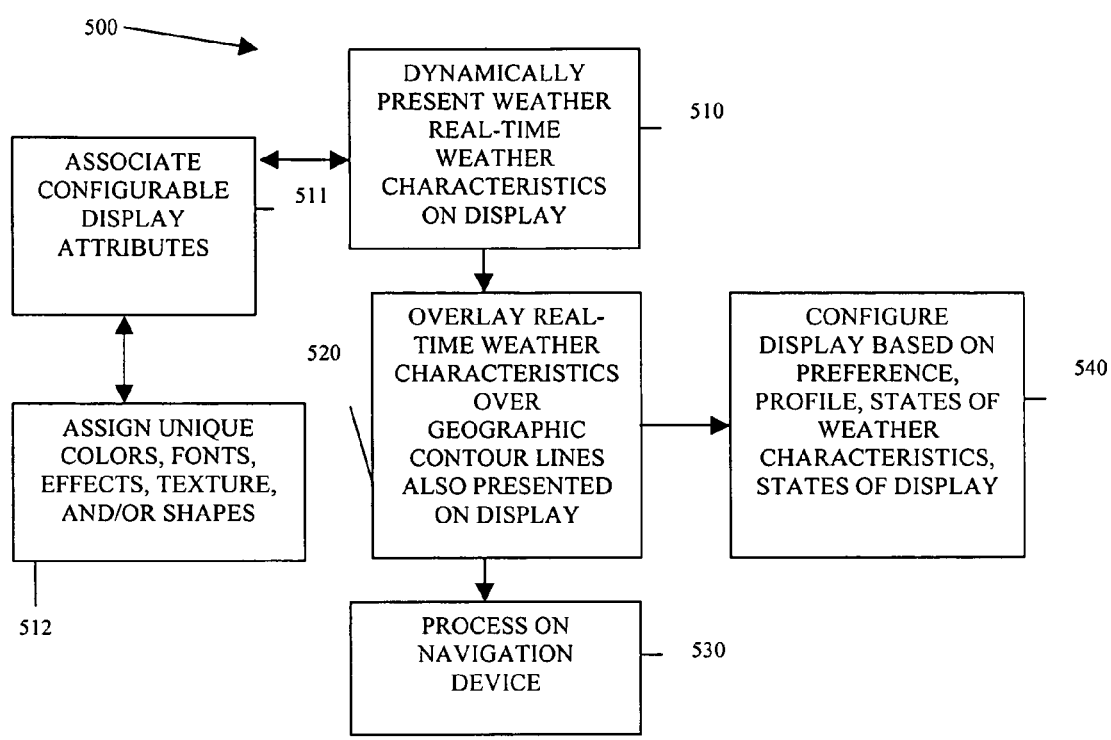
FIG. 5 is a diagram of a method for overlaying real-time weather information on a display with other information, according to an example embodiment.

FIG. 5 is a diagram of a method 500 for overlaying real-time weather information on a display with other information, according to an example embodiment. The method 500 is implemented in a machine-accessible and readable medium.

At 510, real-time weather characteristics are dynamically presented on a display. The real-time weather characteristics may include, but are not limited to, temperature, wind speed, wind direction, visibility distances, barometric pressure, water temperature, wave height, wave period, wave direction, precipitation readings, and others. In an embodiment, the real-time weather characteristics are acquired dynamically from one or more real-time weather services, such as satellite radio and/or services associated with water buoys that track water conditions.

In an embodiment, at 511, configurable display attributes may be dynamically associated and resolved for each of the real-time weather characteristics. The display attributes define locations and/or appearances for the real-time weather characteristics within display presentations. Thus, at 512, unique colors, fonts, effects, textures, and/or shapes may be assigned to different weather characteristic. Moreover, the placement location of different weather characteristics may be defined within the configurable display attributes.

At 520, the real-time weather characteristics are dynamically and concurrently overlaid onto geographic contour lines which are also presented within the display. The contour lines depict an area of a geographic map that is uniquely associated with the real-time weather characteristics. These lines may include a conspicuously placed text label that identifies content for a particular real-time weather characteristic. For example, suppose the real-time weather characteristic is temperature, the contour lines may form shapes such as circles within the geographic map, and conspicuously placed on the circle in a predefined or dynamically determined location is a real-time temperature reading of 70 degrees Fahrenheit. Examples of overlaid contour lines are presented below with FIGS. 12-19.

In an embodiment, at 540, the presentations within the display may be dynamically configured based on predefined preferences, profiles, states of the changing weather characteristics, and/or states of the changing presentations appearing within the display. In some cases, the states of a current position, associated with a navigation device that is implementing the method 500, may also drive presentations occurring within the display.

In one embodiment, at 530, the method 500 is processed within a navigation device. In other embodiments, the processing of the method 500 is processed external to a navigation device and communicated to the navigation device over a network. In still other embodiments, the processing of the method occurs on any processing device and is communicated to a desired display for viewing and interaction.

Figure 6:
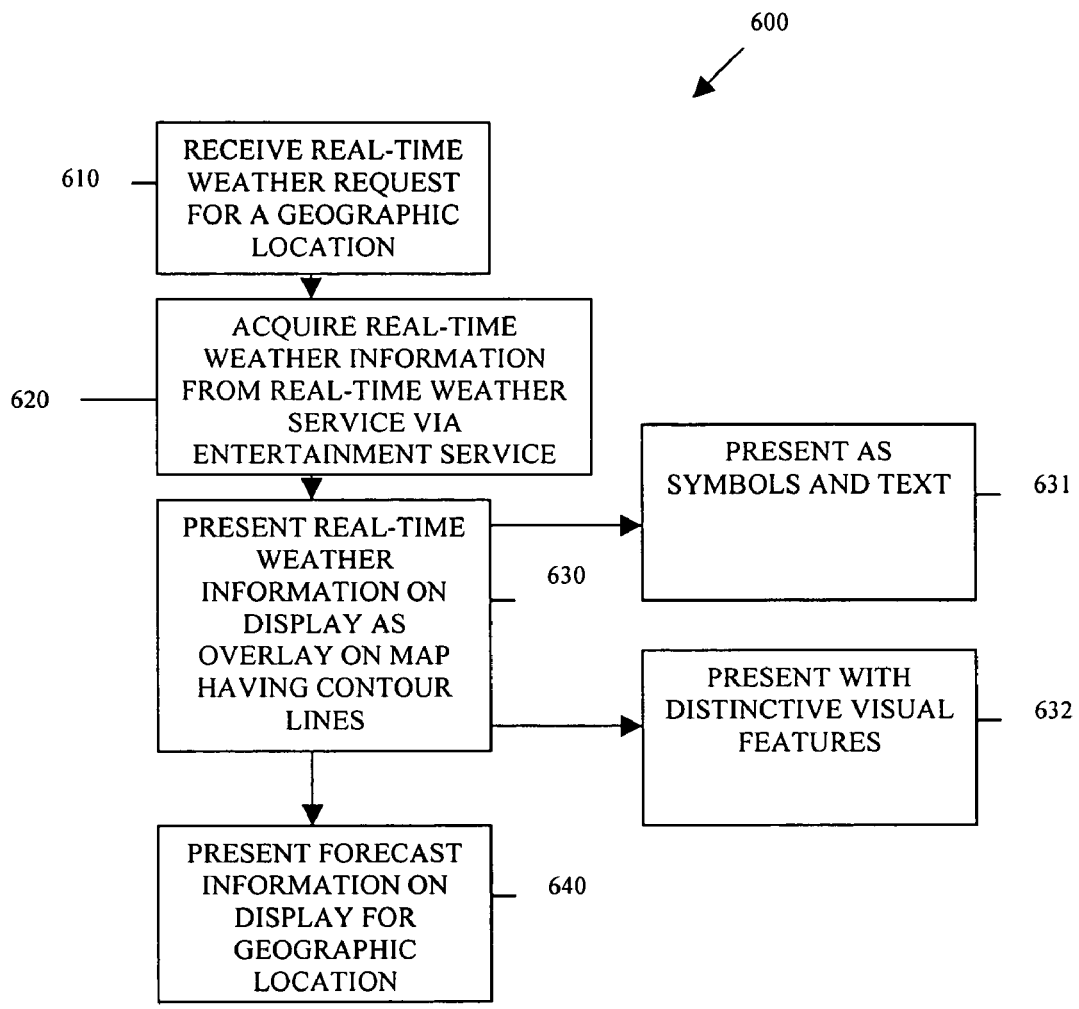
FIG. 6 is a diagram of a method for receiving and presenting real-time weather information on a navigation device, according to an example embodiment.

FIG. 6 is a diagram of a method 600 for receiving and presenting real-time weather information on a navigation device, according to an example embodiment. The method 600 is implemented in a machine-accessible and readable medium and is accessible over a network. The processing of the method 600 is an additional feature that may augment the processing of the methods 100, 200, 300, 400, and 500 of FIGS. 1-5; that feature is a find real-time weather operation.

At 610, a find real-time weather request is received for a given geographic location. The geographic location may be based on a longitude and latitude coordinate, based on a name of a city, based on a characteristic of a city (e.g., capital, size, etc.), based on a selection made by the user from a search result or from an index, and/or based on a dynamic selection made by a user from a cartographic map presented within a display. The geographic location is resolved by the method 400 into a longitude and latitude coordinate or into a format that the method 600 desires for interacting with a real-time weather service.

Accordingly, at 620, real-time weather information is acquired from a real-time weather service over a network. In an embodiment, the network is wireless, such as via satellite communications where the real-time weather service is a satellite radio weather service available through a real-time entertainment service.

At 630, the acquired real-time weather information for the given geographic location is presented on the display of a navigation device as an overlay on a map. The map also depicts contour lines associated with the given geographic location and a configurable surrounding area associated with the given geographic location.

In an embodiment, at 631, the real-time weather information may be presented as both graphical symbols and as text. Moreover, in an embodiment, at 632, the real-time weather information may be presented with unique visual features within the navigation device's display.

In another embodiment, at 640, the real-time weather information may also include forecast information associated with the given geographic location. In this embodiment, the forecast information may also be presented within the display. Examples of display presentations for the find weather feature and its output are depicted with FIGS. 20-27 below.

Figure 7:
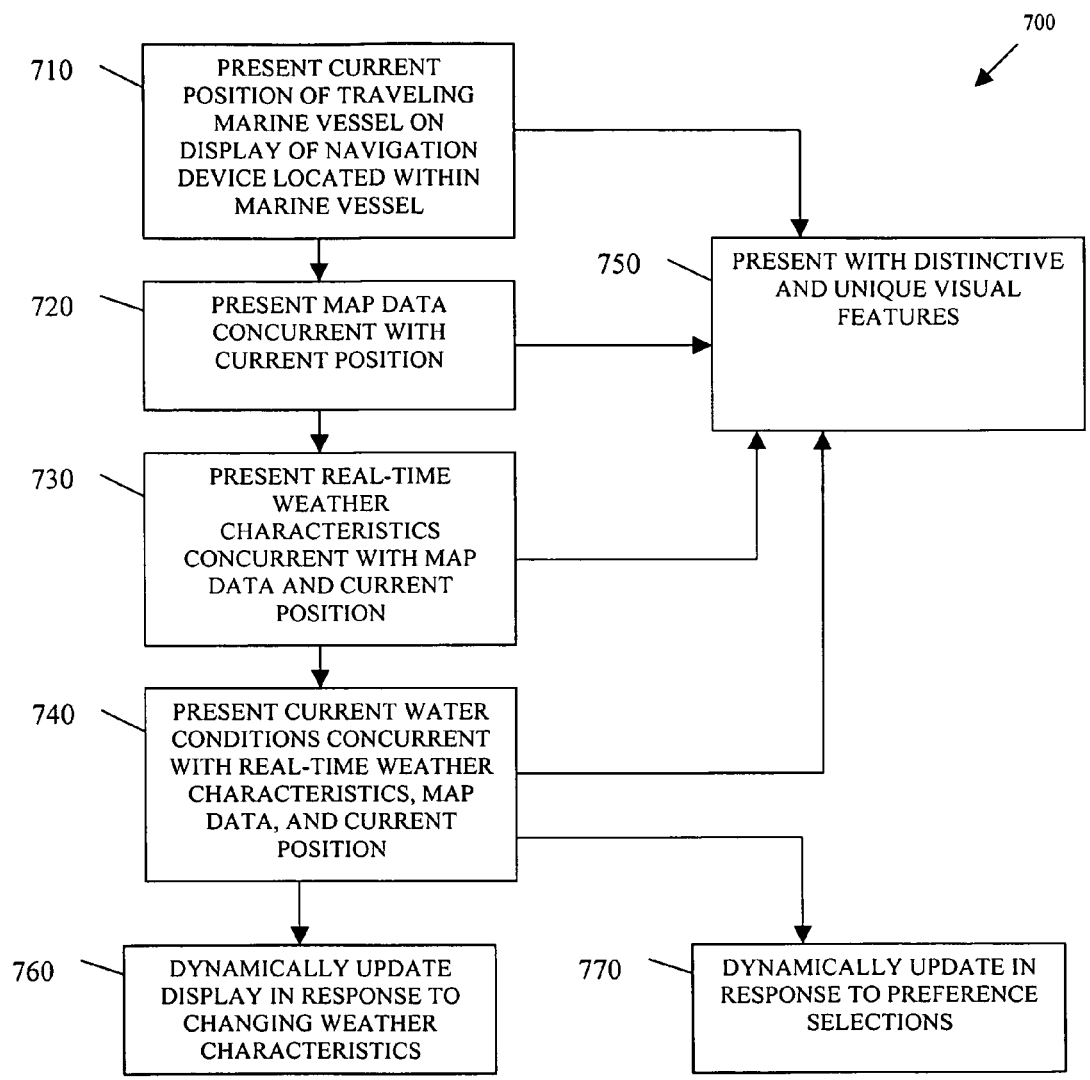
FIG. 7 is a diagram of a method for presenting real-time weather information on a navigation device located within a marine vessel, according to an example embodiment.

FIG. 7 is a diagram of a method 700 for presenting real-time weather information on a navigation device located within a marine vessel, according to an example embodiment. The method 700 is implemented in a machine-accessible and readable medium and is accessible over a network. The method 700 presents a specific example implementation of the methods 100, 200, 300, 400, 500, and/or 600 of FIGS. 1-6. It is understood that other implementations or uses of these methods are foreseeable and intended to fall within the generous scope of this invention. Therefore, the description presented with method 700 is not intended to limit other embodiments of the invention.

Initially, a marine vessel is equipped with a navigation device. The navigation device includes cartographic data associated with maps and characteristics of bodies of water and perhaps with maps having land descriptions and land attribute information. The navigation device is interfaced over a wireless network, such as over a satellite network, with a positioning service, such as a GPS service. Additionally, the navigation device is interfaced to one or more wireless real-time weather services, such as satellite radio weather services (satellite radio also includes entertainment services) and satellite or radio frequency or cellular buoy water condition services. Finally, the navigation device is equipped with the processing logic depicted by FIG. 7 representing the processing of the method 700.

During operation of the method 700, at 710, current positions of the traveling marine vessel are presented on a display of the navigation device. The display and the navigation device are located within the traveling marine vessel. In some cases, the navigation device may be integrated into a chart plotter device of the marine vessel. In other arrangements, the navigation device is a standalone and portable device that is carried onto the marine vessel and initiated.

At 720, map data is concurrently presented with the changing current positions of the traveling marine vessel within the display. At 730, real-time weather characteristics are concurrently presented within the display with the current positions and the map data. Moreover, at 740, real-time water conditions are concurrently presented within the display with the real-time weather characteristics, the map data, and the current positions.

At 750, the different types of information are dynamically and concurrently presented within the display with unique visual features. At 760, the presentations within the display may be dynamically updated in response to changing weather characteristics, changing water conditions, changing display states, changing current position states, and the like. Furthermore, at 770, the display presentations may be dynamically updated in response to preference selections made by a user interfaced to the navigation device.

Figure 8:
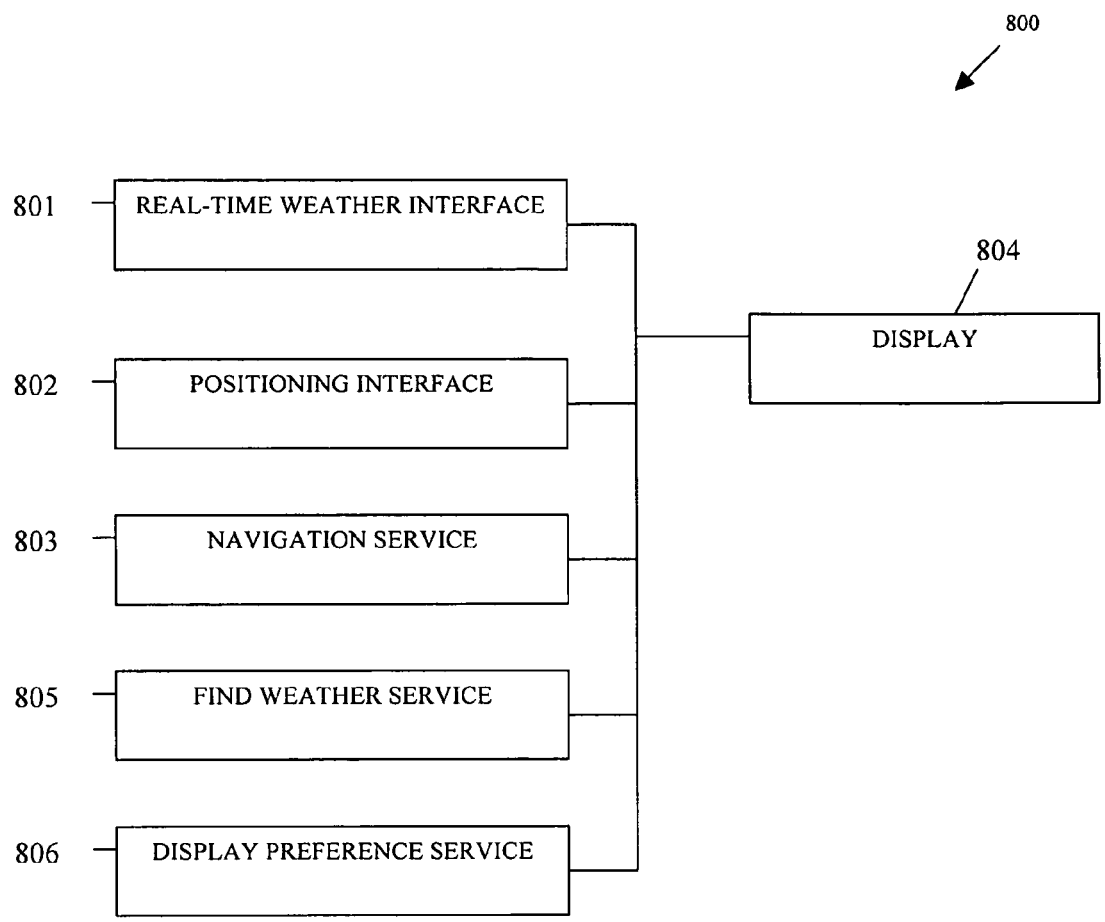
FIG. 8 is a diagram of a navigation device with real-time weather capabilities, according to an example embodiment.

FIG. 8 is a diagram of a navigation device 800 with real-time weather capabilities, according to an example embodiment. The navigation device 800 is implemented within hardware and software. In some cases, the navigation device 800 is a standalone and portable device. In other cases, the navigation device 800 is integrated within other devices, such as marine chart plotters, personal computers, personal digital assistants (PDAs), cell phones, digital tablets, and the like.

The navigation device 800 includes a real-time weather interface 801, a positioning interface 802, a navigation service 803, and a display 804. In some embodiments, the navigation device 800 also includes a find weather service 805, and/or a display preference service 806.

The real-time weather interface 801 is adapted to communicate wirelessly over a network with a real-time weather service via a real-time entertainment service for purposes of acquiring real-time weather information and real-time weather characteristics for a current position or for a given geographic location. The real-time weather information may also include current water conditions associated with a given location within a given body of water.

The positioning interface 802 is adapted to communicate wirelessly over a network with a positioning service. The positioning service returns positioning information for the navigation device 800, such as but not limited to current time of day, current date, current geographical location, current elevation, and the like.

The navigation service 803 is adapted to interface with the positioning interface 802 for purposes of continuously and dynamically acquiring the positioning information for the navigation device 800. The navigation service 603 is adapted to process the positioning information and to process cartographic data into maps which may be presented within the display 804 to depict the current position of the navigation device 800 relative to a preconfigured amount of geographical space that surrounds the current position and the route on which the navigation device 800 is traveling. The map that represents the configurable amount of geographical space is adapted to be derived by the navigation service 803 from the cartographic data.

The find weather service 805 is adapted to interface with the real-time weather interface 801 for purposes of acquiring the real-time weather information and characteristics. The real-time weather information and characteristics are adapted to be presented within the display 804 concurrent with the map and the current position which are presented by the navigation service 803.

The display 804 is adapted to concurrently present overlaid presentations of the real-time weather characteristics onto the map data, where the map data includes a current position of the navigation device 800, the route for the navigation device 800, and a configurable amount of geographic space that surrounds the current position and the route.

In an embodiment, the real-time weather interface 801 is adapted to include a plurality of real-time weather functions. Each real-time function adapted to be associated with a unique one of the real-time weather characteristics or a unique set of real-time weather characteristics. Moreover, a number of the real-time weather functions are adapted to alter presentations presented within the display 804 and other ones of the functions are adapted to acquire different ones of the real-time weather characteristics from the real time weather service. In an embodiment, the real-time weather interface is packaged as an API within the navigation device 800.

In another embodiment, the navigation service 800 includes a find weather service 805 which is adapted to communicate with the real-time weather interface 801 in order to obtain current and/or forecasted weather conditions for a selected geographic location. The find weather service 805 is also adapted to alter a presentation within the display 804 for purposes of presenting current and forecasted weather conditions or water conditions (e.g., water temperature, wave height, wave direction, wave period, tidal information, sonar depth, etc.). In some arrangements, the find weather service 805 is adapted to alter the presentations within the display 804 with presentations that include graphical symbols and text which depict the current and forecasted weather conditions.

In more embodiments, the navigation device 800 may also include a display preference service 806. The display preference service 806 is adapted to dynamically configure presentations of the display 804 based on a variety of conditions or states. For example, the display preference service 806 may configure the presentations based at least in part on states of the display 804, conditions associated with the one or more real-time weather conditions, states associated with the route of the navigation device 800 or a current position of the navigation device 800, and profiles associated with users or with the navigation device 800.

The display preference service 806 may be further adapted to dynamically present within the display 804 each of the unique real-time weather characteristics with unique visual features. Furthermore, the display preference service 806 may present the map data and the current position of the navigation device 800 with other unique visual features. In some embodiments, the display preference service 806 is also adapted to concurrently present within the display 604 water conditions, the one or more real-time weather characteristics, the map data, and the current position of the navigation device 800. Again, the water conditions may be presented by the display preference service 806 with still other unique visual features.

Figure 9:
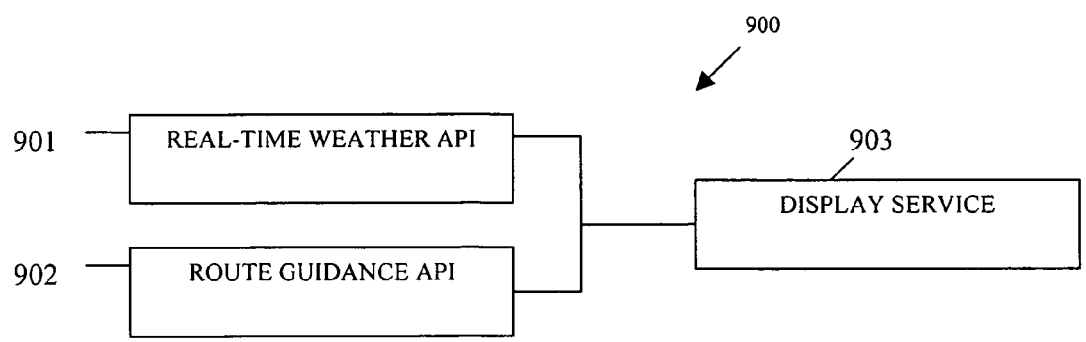
FIG. 9 is a diagram of another navigation device with real-time weather capabilities, according to an example embodiment.

FIG. 9 is a diagram of another navigation device 900 with real-time weather capabilities, according to an example embodiment. The navigation device 900 is implemented in software and interfaces with one or more hardware components such as a processor, memory, and display. The navigation device 900 is adapted to communicate over a wireless network with one or more external services.

The navigation device 900 includes a real-time weather API 901, a route-guidance API 902, and a display service 903. The real-time weather API 901 is adapted to include a plurality of real-time weather functions. The real-time weather functions are adapted to dynamically obtain real-time weather characteristics from a real-time weather service over a network via a real-time entertainment service, such as satellite radio.

The route guidance API 902 is adapted to include a plurality of route-guidance functions. A number of the route-guidance functions are adapted to dynamically obtain a current position for the navigation device 900 from a positioning service. Other ones of the route-guidance functions are adapted to generate a route for the navigation device 900 from the current position to a destination position. The route guidance API is also adapted to derive maps from cartographic data, which is accessible to the navigation device 900. The derived maps depict a configurable amount of geographic space that surrounds the route and the current position of the navigation device 900.

The display service 903 is adapted to dynamically and concurrently present within a display of the navigation device 900, the real-time weather characteristics obtained from the real-time weather API which is overlaid onto map data derived from the route guidance API 902. The display service 903 is further adapted to present each of the plurality of weather characteristics with unique visual features and also adapted to present the route, the current position, and the configurable amount of geographic space with other unique features.

In an embodiment, the display service 903 is also adapted to dynamically and automatically alter the appearance or amount of data being presented within the display based on a quantity of data, a density of data, a preference, a profile, a state associated with the real-time weather characteristics, and/or a state associated with the current position.

In more embodiments, a number of the real-time weather functions of the real-time weather API are adapted to be selected by or configured by a user that interacts with the navigation device 900. In still other situations, some of the real-time weather functions are adapted to be presented within the display as icons, menu selections, and/or links.

In some arrangements, the map data is adapted to include contour lines associated with configurable areas within the geographic space. Further, the geographic space may be associated with land or a body of water.

Figure 10:
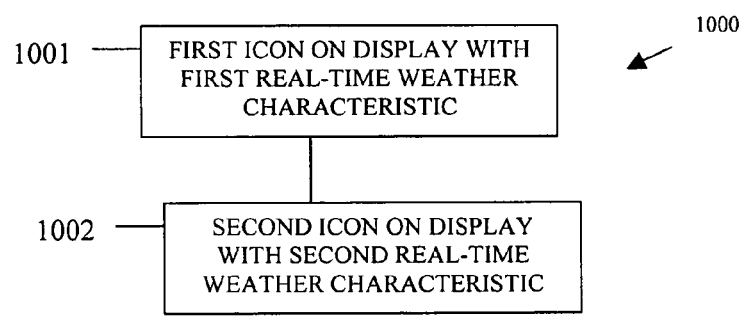
FIG. 10 is a diagram of still another navigation device with real-time weather capabilities, according to an example embodiment.

FIG. 10 is a diagram of still another navigation device 1000 with real-time weather capabilities, according to an example embodiment. The navigation device 1000 is implemented within a machine-accessible and readable medium.

The navigation device 1000 includes a first icon 1001 and a second icon 802. The first icon 1001 is adapted to be associated with a first real-time weather characteristic. Moreover, the second icon is adapted to be associated with a second real-time weather characteristic.

Furthermore, the first 1001 and second 1002 icons are adapted to be dynamically and concurrently presented within a display of the navigation device 1000 along with the first and second real-time weather characteristics and map data. The map data is adapted to include a route for the navigation device 1000, a current position for the navigation device, and a configurable amount of data associated with a geographical space that surrounds the route and the current position.

In an embodiment, at least one of the icons 1001 or 1002 is adapted to be associated with a display attribute function. The display attribute function is adapted to be selected in order to alter the presentations within the display.

In another embodiment, at least one of the icons 1001 or 1002 is adapted to appear as a symbol within presentations of the display. The symbol is also adapted to appear as portions of the first or second weather characteristic. In this manner, the symbol may appear as part of the presentation for a weather characteristic and be selectable, such that when selected a display attribute function is processed on the navigation device 1000.

In still other embodiments, at least one of the icons is adapted to be selected and to call a real-time weather service in order to update data associated with the first or second weather characteristic. In other cases, at least one of the icons is adapted to be selected and to call a display preference service in order to alter an arrangement or an appearance of the first or second weather characteristic.

Figure 11:
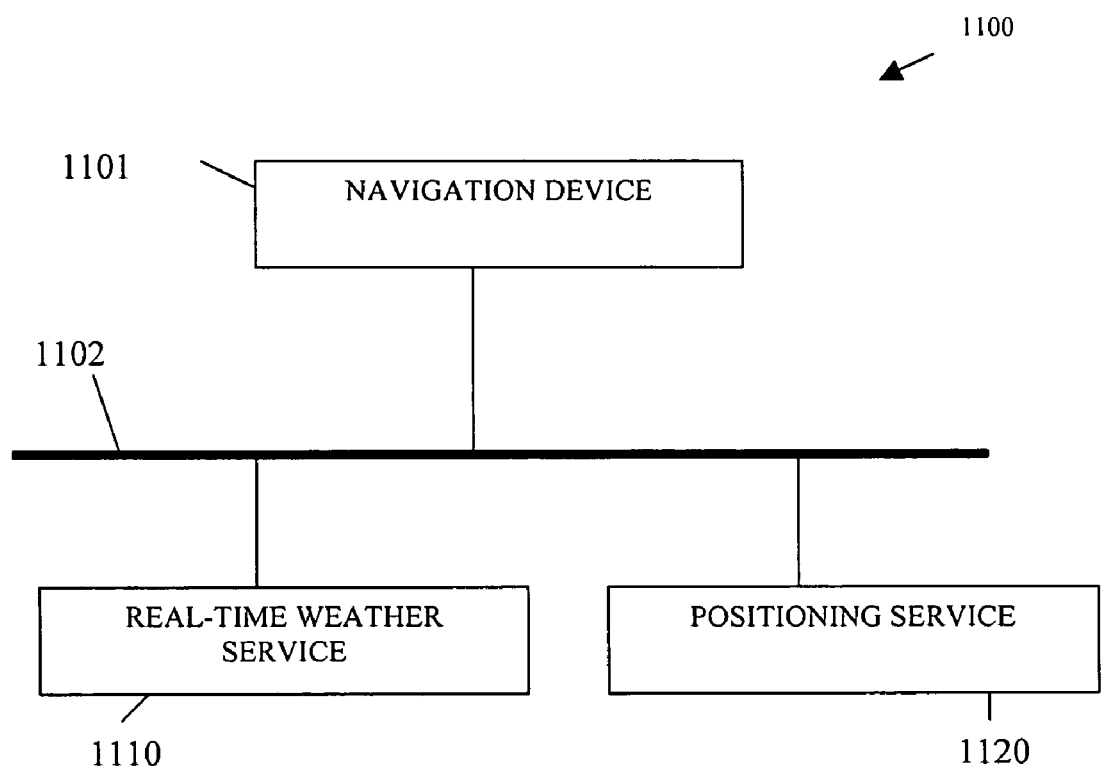
FIG. 11 is a diagram of real-time weather navigation system, according to an example embodiment.

FIG. 11 is a diagram of real-time weather navigation system 1100, according to an example embodiment. The real-time weather navigation system 1100 is implemented in a machine-accessible and readable medium. In an embodiment, at least a portion of the real-time weather navigation system 1100 includes navigation devices 800, 900, and/or 1000 of FIGS. 8-10 where those navigation devices implement the methods 100, 200, 300, 400, 500, 600, and/or 700 of FIGS. 1-7.

The real-time weather navigation system 1100 includes a navigation device 1101 and a network 1102. The navigation device 1101 is adapted to acquire real-time weather information over the network 1102 from a real-time weather service 1110 via a real-time entertainment service. Furthermore, the real-time weather navigation system 1100 is adapted to acquire current positioning information associated with the real-time weather navigation system 1100 from a positioning service 1120 over the network 1102.

The navigation device 1101 is also adapted to dynamically and concurrently present the real-time weather information along with map data on a display of the navigation device 1101. The map data includes the positioning information and a route for the navigation device 1101. The real-time weather information includes unique weather characteristics, and the unique weather characteristics are adapted to be presented with unique visual features on the display by the navigation device 1101.

In an embodiment, the network 1102 is wireless, such as a satellite network. In some embodiments, the network 1102 is a combination of different types of networks that communicate and act as a single logical network 1102. For example, the navigation device 1101 may communicate over a portion of the network 1110 that is cellular or radio frequency communications in order to acquire water conditions from wireless buoy transmitters and simultaneously communicate over another portion of the network 1110 that is satellite communications in order to acquire real-time weather conditions.

The navigation device 1101 may be portable or may be integrated into other devices or equipment. For example, the navigation device 1101 may be integrated into a land vehicle, a marine vessel, spacecraft, or an aircraft. Alternatively, the navigation device 1101 may be integrated into any processing device or may be a standalone device.

In an embodiment, the map data is adapted to include contour lines associated with selectable areas of a geographical space that surrounds the route. Moreover, the real-time weather information is adapted to be augmented with conditions associated with a body of water, such as water temperature, wave height, wave period, wave direction, tidal information, sonar depth, and the like.

Figure 12:
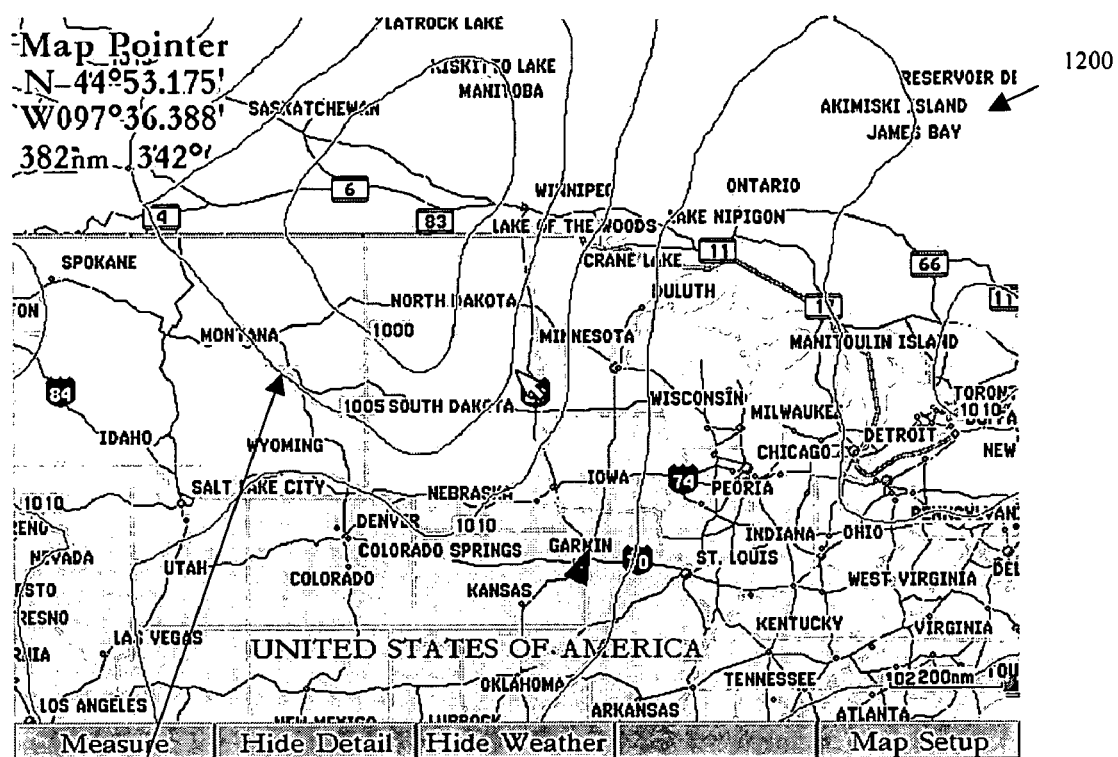
FIG. 12 is an example diagram of a display presentation for displaying real-time barometric pressure readings overlaid on a cartographic map, according to an example embodiment.

FIG. 12 is an example diagram 1200 of a display presentation for displaying real-time barometric pressure readings overlaid on a cartographic map, according to an example embodiment. FIG. 12 is presented for purposes of illustration only and is not intended to limit the various embodiments presented with this invention.

FIG. 12 visually depicts a variety of contour lines 1201 that include text labels that identify a specific barometric reading. The contour bands segment a specific area within a geographic space that depicts cartographic data associated with land. The diagram 1200 depicts graphical symbols as well as text information. The example contour line 1201 shows a band of an area where the real-time barometric reading is 1005. In some embodiments, the overlaid contour lines of barometric real-time weather information are displayed in a unique color or combination of colors, such as red with a white halo. It should also be noted, that the units of real-time weather information is a configurable display attribute with various embodiments of the invention, such that the units may be dynamically configured or changed as desired.

Figure 13:
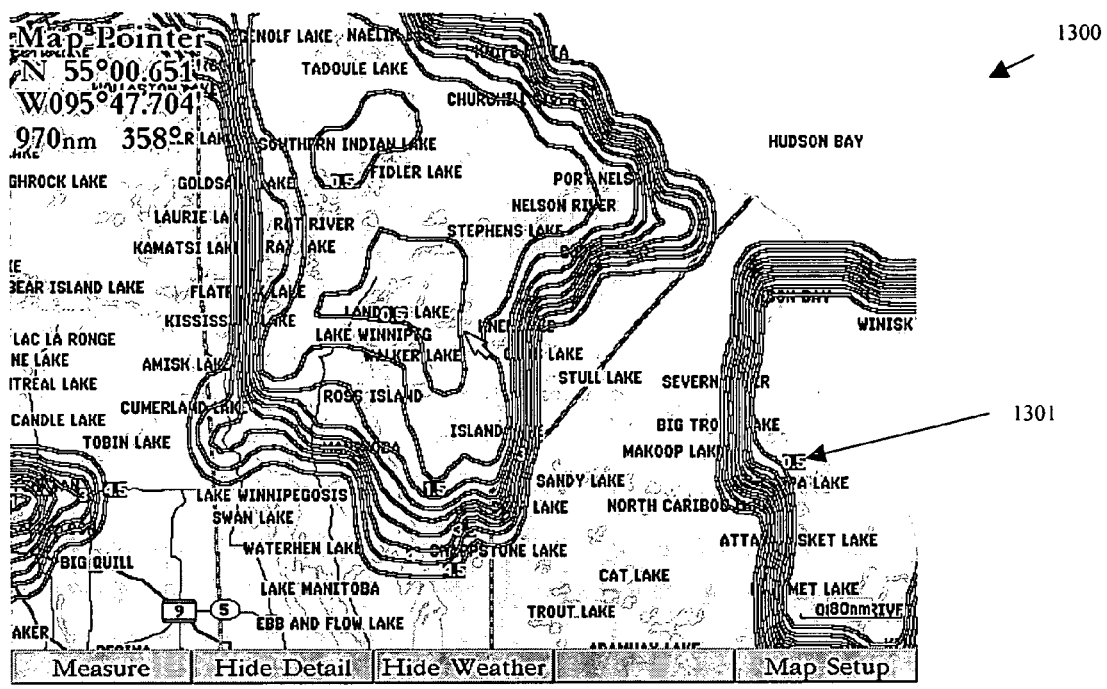
FIG. 13 is an example diagram of a display presentation for displaying real-time visibility distance readings overlaid on a cartographic map, according to an example embodiment.

FIG. 13 is an example diagram 1300 of a display presentation for displaying real-time visibility distance readings overlaid on a cartographic map, according to an example embodiment. Again, FIG. 13 is presented for purposes of illustration only and is not intended to limit any of the embodiments presented herein.

The diagram 1300 shows real-time visibility distances represented as contour lines that carve out selected areas over a geographic space. For example, the visibility represented by 1301 is 0.5 miles. In an embodiment, the visibility contour lines may be represented by unique colors or combinations of colors, such as yellow with a black halo.

Figure 14:
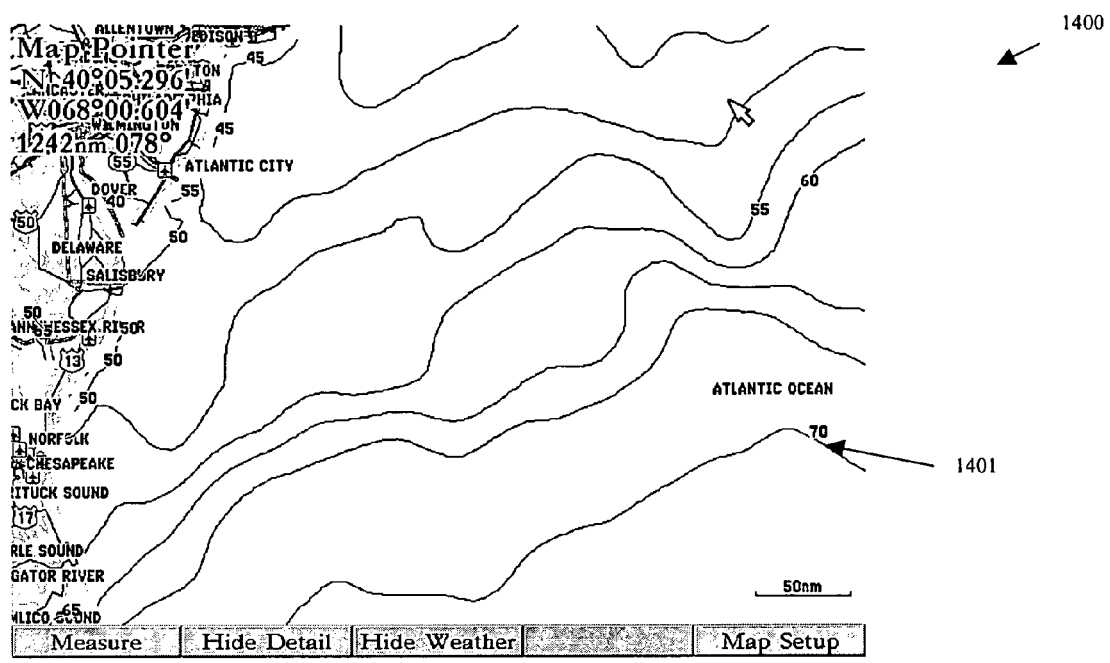
FIG. 14 is an example diagram of a display presentation for displaying real-time temperature readings overlaid on a map depicting a body of water, according to an example embodiment.

FIG. 14 is an example diagram 1400 of a display presentation for displaying real-time temperature readings overlaid on a map depicting a body of water, according to an example embodiment. FIG. 14 is presented for purposes of illustration only and is not intended to limit the embodiments presented herein.

In FIG. 14 real-time water temperature readings are presented as contour lines that overlay map data associated with a body of water. For example, the contour line at 1401 depicts a water temperature of 70 degrees Fahrenheit. The contour line carves out an area over the map data where along the line the water temperature remains 70 degrees Fahrenheit. In an embodiment, the water temperature readings are presented with contour lines that are blue with a white halo.

Figure 15:
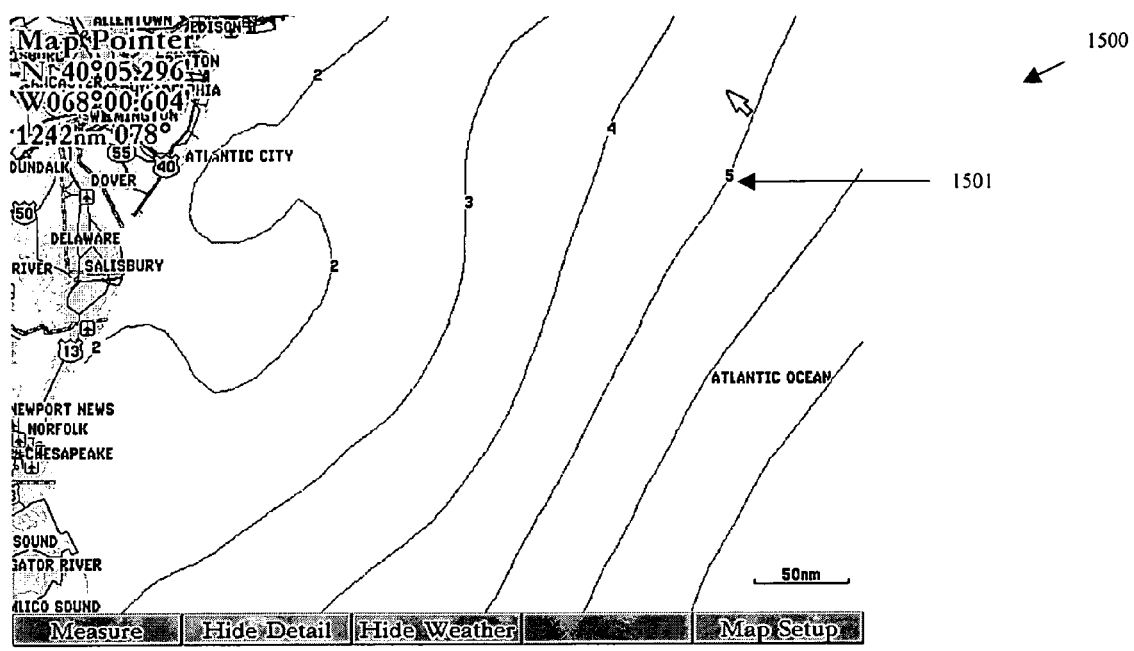
FIG. 15 is an example diagram of a display presentation for displaying real-time wave height readings overlaid on a map depicting a body of water, according to an example embodiment.

FIG. 15 is an example diagram 1500 of a display presentation for displaying real-time wave height readings overlaid on a map depicting a body of water, according to an example embodiment. FIG. 15 is presented for purposes of illustration only and is not intended to limit the various embodiments of the invention presented herein.

The diagram 1500 depicts real-time wave height readings overlaid on map data depicting a body of water. For example, the contour line depicted at 1501 illustrates waves having a height of 5 feet. Again, a single continuous contour line depicts areas within the body of water or map with the same real-time wave height. In an embodiment, the wave height contour lines are presented in purple with a white halo.

Figure 16:
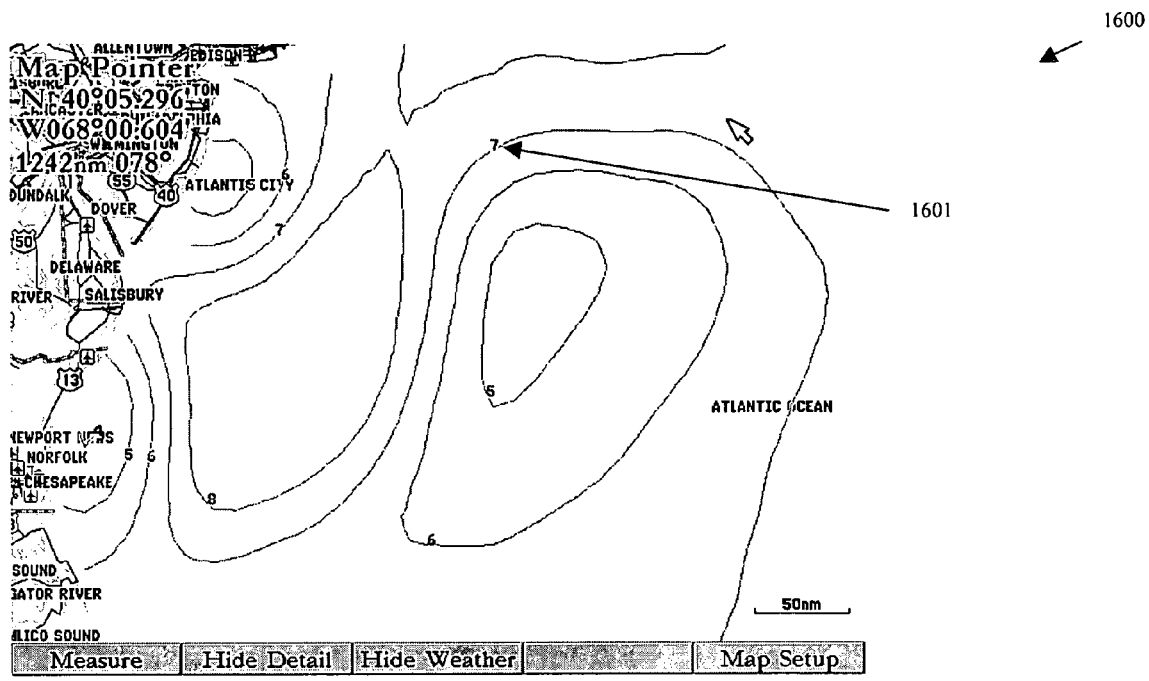
FIG. 16 is an example diagram of a display presentation for displaying real-time wave period readings overlaid on a map depicting a body of water, according to an example embodiment.

FIG. 16 is an example diagram 1600 of a display presentation for displaying real-time wave period readings overlaid on a map depicting a body of water, according to an example embodiment. FIG. 16 is presented for purposes of illustration and is not intended to limit any embodiment of the invention presented herein.

The diagram 1600 depicts real-time wave periods. The contour line depicted at 1601 depicts waves having a period of 7, such that all waves within the area represented by contour line 1601 have the same period of 7. In an embodiment, the wave period contour lines are presented in green with a white halo.

Figure 17:
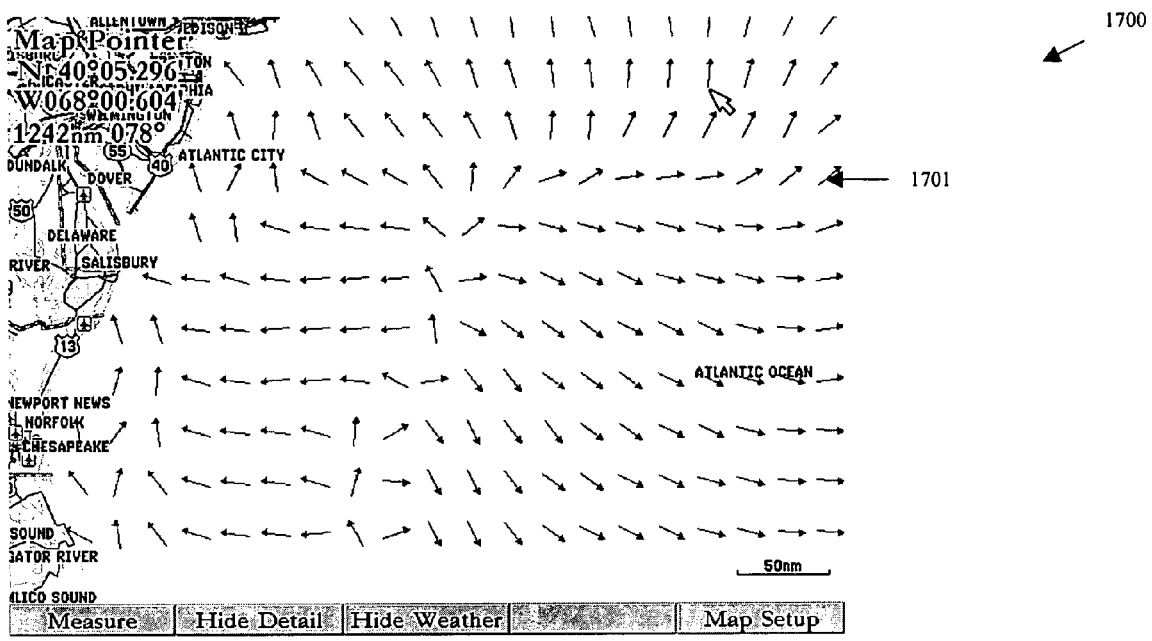
FIG. 17 is an example diagram of a display presentation for displaying real-time wave direction readings overlaid on a map depicting a body of water, according to an example embodiment.

FIG. 17 is an example diagram 1700 of a display presentation for displaying real-time wave direction readings overlaid on a map depicting a body of water, according to an example embodiment. FIG. 17 is presented for purposes of illustration only and is not intended to limit embodiments of the invention.

The diagram 1700 depicts the real-time wave directional indications for a given body of water depicted in the map. The wave directional indication presented at 1701 depicts waves that are moving in a north-eastern direction. In an embodiment, the wave directional indications are presented in red to contrast marine cartography.

Figure 18:
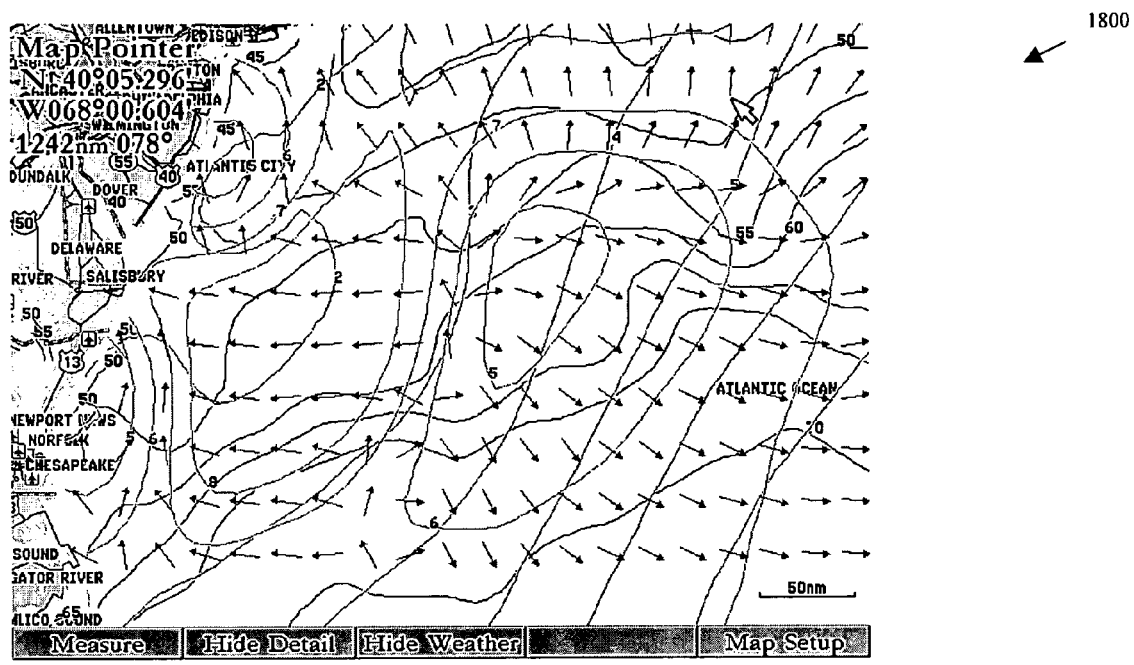
FIG. 18 is an example diagram of a display presentation for displaying real-time weather and water readings combined and overlaid on a map depicting a body of water, according to an example embodiment.

FIG. 18 is an example diagram 1800 of a display presentation for displaying real-time weather and water readings combined and overlaid on a map depicting a body of water, according to an example embodiment. FIG. 18 is presented for purposes of illustration only and is not intended to limit the embodiments of the invention.

The diagram 1800 depicts how real-time weather and water conditions presented in FIGS. 14-17 may be combined and overlaid on one another to present a comprehensive view of current conditions for a body of water. Again, each of the distinct real-time weather and water conditions may be presented in unique colors or combinations of colors (as mentioned above).

Figure 19:
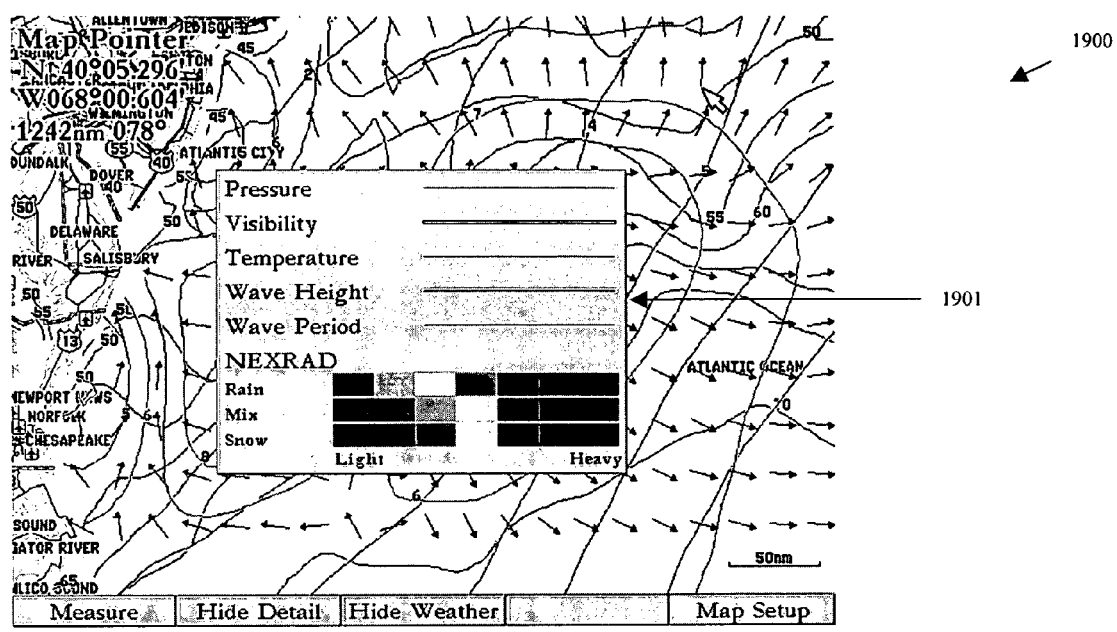
FIG. 19 is an example diagram of a display presentation of FIG. 16 augmented with a legend, according to an example embodiment.

FIG. 19 is an example diagram 1900 of a display presentation of FIG. 18 augmented with a legend, according to an example embodiment. FIG. 19 is presented for purposes of illustration only and is not intended to limit the embodiments of the invention. The diagram 1900 depicts a legend that may be selected from a display presentation for purposes of discerning the detail of real-time weather and water conditions presented in FIG. 18.

Figure 20:
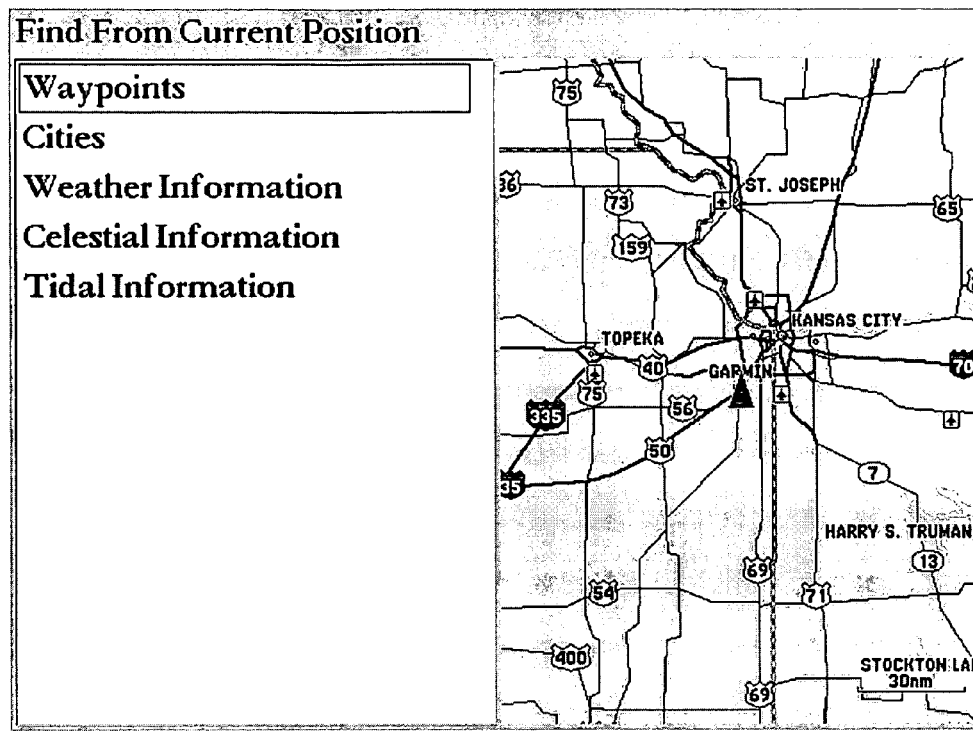
FIG. 20 is an example diagram of a display presentation for displaying a find weather feature, according to an example embodiment.

FIG. 20 is an example diagram of a display presentation 2000 for displaying a find weather feature, according to an example embodiment. FIG. 20 is presented for purposes of illustration and is not intended to limit the embodiments of the invention.

The display presentation 2000 depicts a selectable menu that is activated when a user selects a find weather feature. A variety of real-time information may be obtained, such as weather information, celestial information, and tidal information. These items are selectable on the left portion of the presentation 2000, while the right portion of the presentation continues to present a current position and map data associated with a navigation device.

Figure 21:
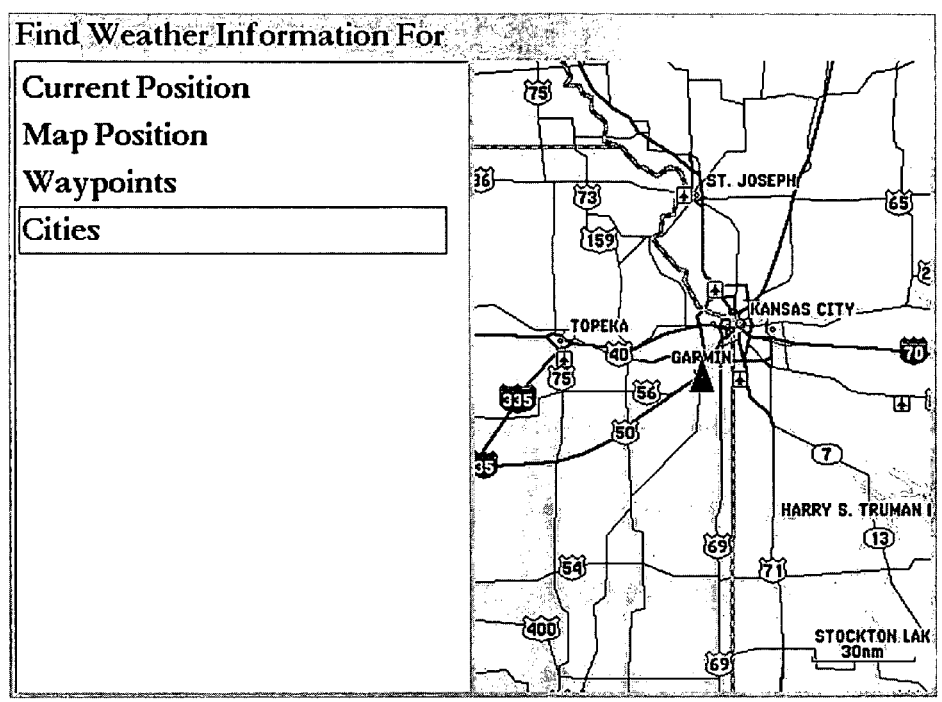
FIG. 21 is an example diagram of another display presentation for displaying a find weather feature, according to an example embodiment.

FIG. 21 is an example diagram of another display presentation 2100 for displaying a find weather feature, according to an example embodiment. FIG. 21 is presented for purposes of illustration and is not intended to limit the embodiments presented herein.

The display presentation 2100 depicts a selectable menu for an activated find weather feature, where cities are selected as a desired option to search for real-time weather information. Again, the left-side of the presentation 2100 includes selectable menu items while the right-side of the presentation 2100 depicts a current position and map data for the navigation device.

Figure 22:
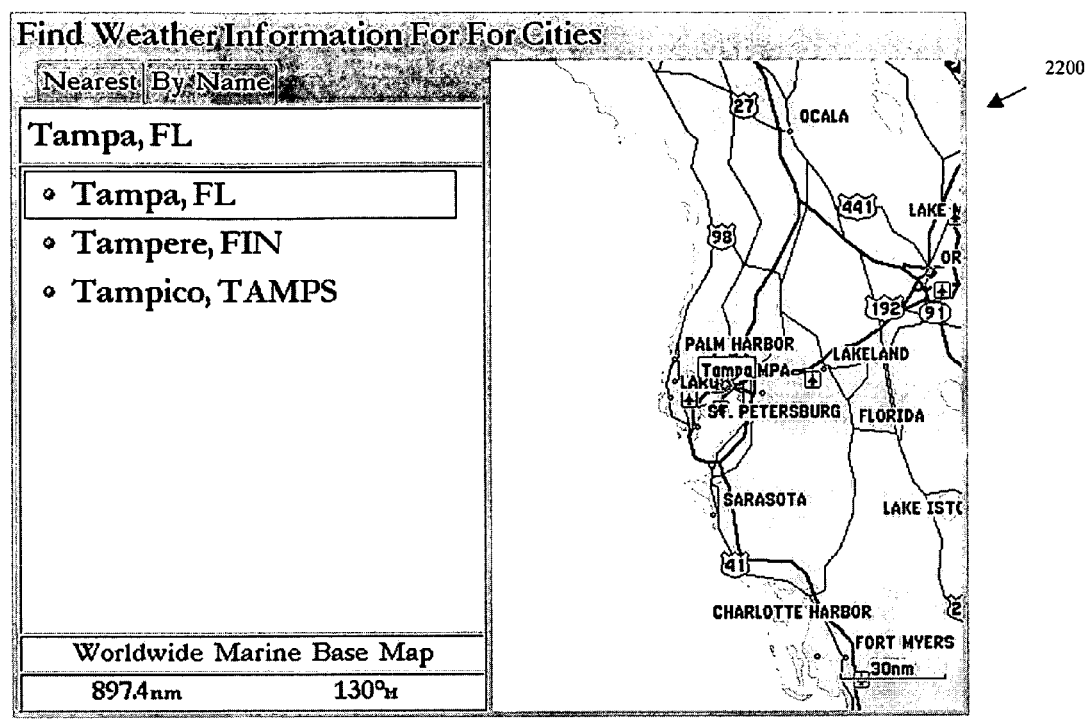
FIG. 22 is an example diagram of still another display presentation for displaying a find weather feature, according to an example embodiment.

FIG. 22 is an example diagram of still another display presentation 2200 for displaying a find weather feature, according to an example embodiment. FIG. 22 is presented for purposes of illustration only and is not intended to limit the present invention.

The presentation 2200 depicts index or search results where a specific city such as "TAMP*" was searched and three cities were found. In the example presentation, the U.S. city of Tampa, Fla. was selected. Accordingly, the right-side of the presentation 2200 depicts a map of Tampa, along with real-time weather characteristics overlaid onto the map.

Figure 23:
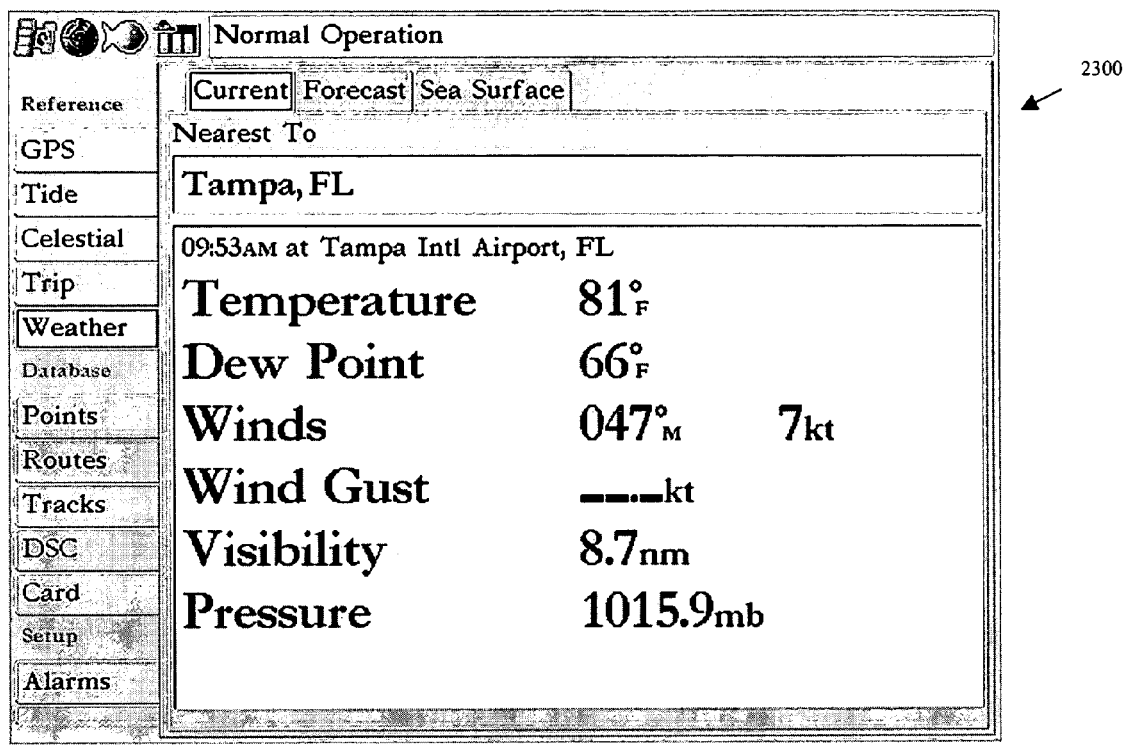
FIG. 23 is an example diagram of a display presentation for displaying a find weather feature results, according to an example embodiment.

FIG. 23 is an example diagram of a display presentation 2300 for displaying a find weather feature results, according to an example embodiment. FIG. 23 is presented for purposes of illustration only and is not intended to limit the embodiments of the invention.

The presentation 2300 depicts a pop-up presentation for the real-time weather information associated with Tampa, Fla. as was selected in FIG. 22. A variety of real-time weather information is presented in text form for easy reading and comprehension.

Figure 24:
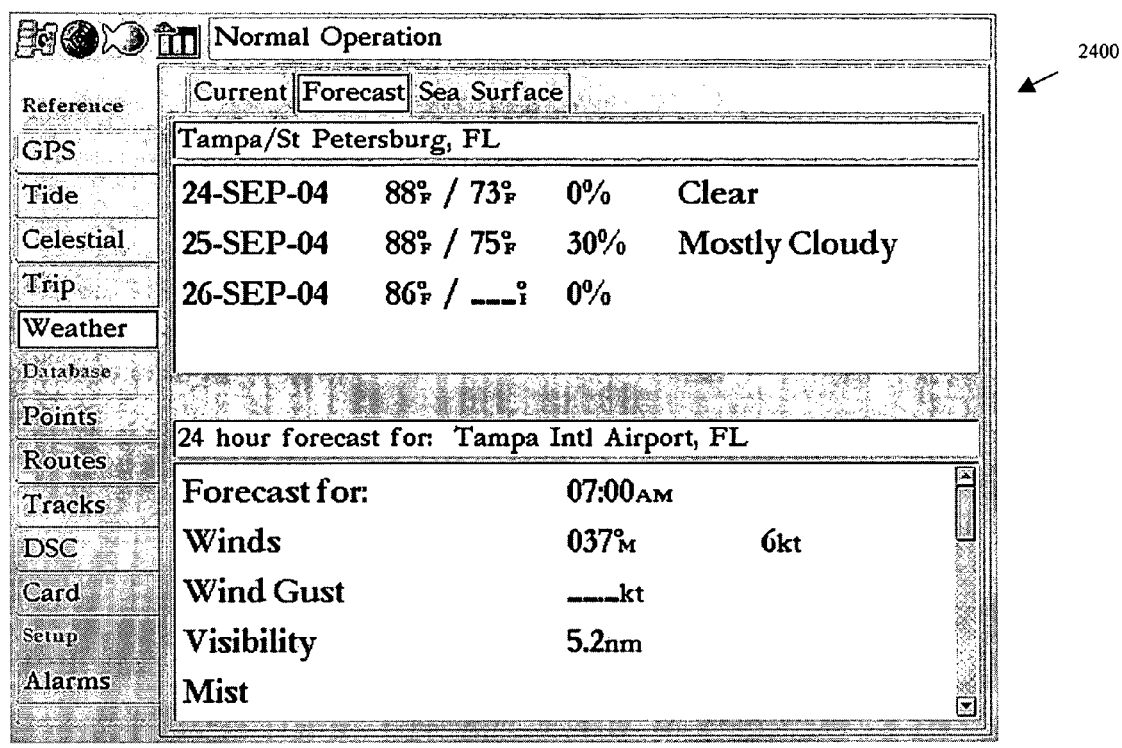
FIG. 24 is an example diagram of a display presentation for displaying a forecast, according to an example embodiment.

FIG. 24 is an example diagram of a display presentation 2400 for displaying a forecast, according to an example embodiment. FIG. 24 is presented for purposes of illustration only and is not intended to limit the embodiments of the invention.

The presentation 2400 depicts real-time forecast information for the city of Tampa, Fla. which was selected in FIG. 22. A variety of forecast information is presented in text format for easy reading and comprehension.

Figure 25:
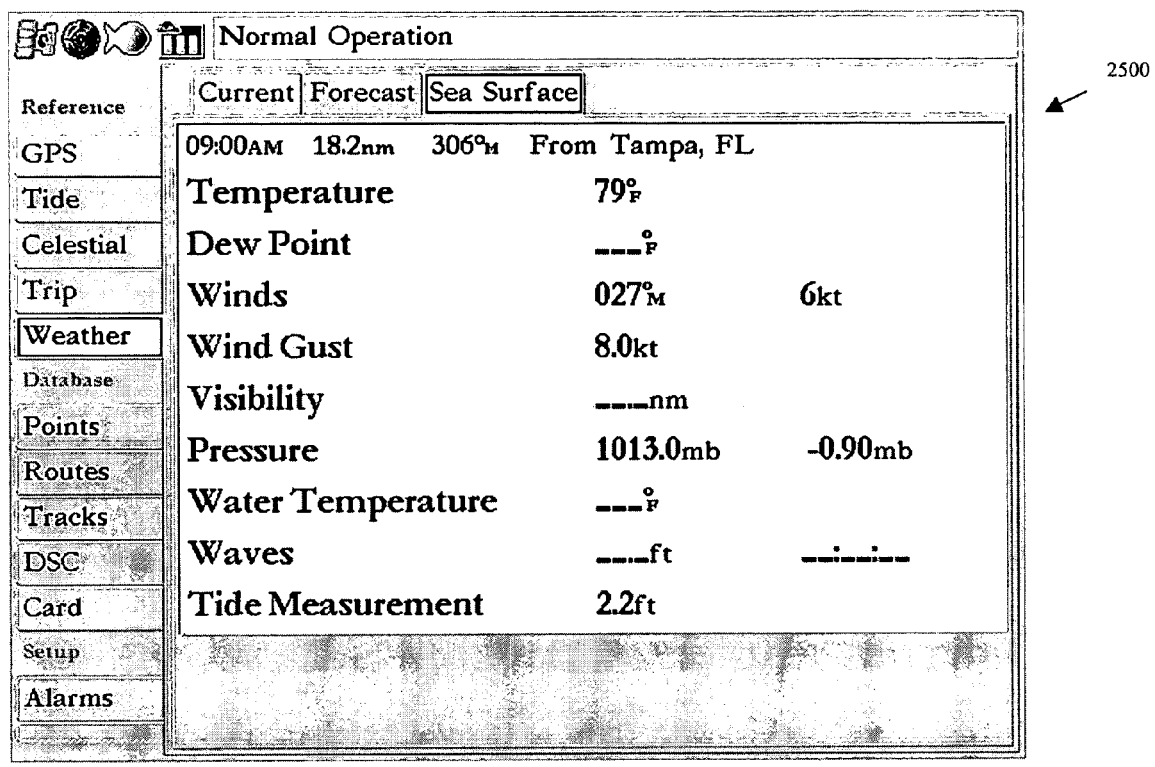
FIG. 25 is an example diagram of a display presentation for displaying real-time weather and water conditions, according to an example embodiment.

FIG. 25 is an example diagram of a display presentation 2500 for displaying real-time weather and water conditions, according to an example embodiment. FIG. 25 is presented for purposes of illustration only and is not intended to limit the embodiments of the invention.

The display presentation 2500 depicts water conditions for the Gulf of Mexico that borders Tampa, Fla., which was selected in FIG. 22. A variety of available sea surface information is presented in text format for easy reading and comprehension.

Figure 26:
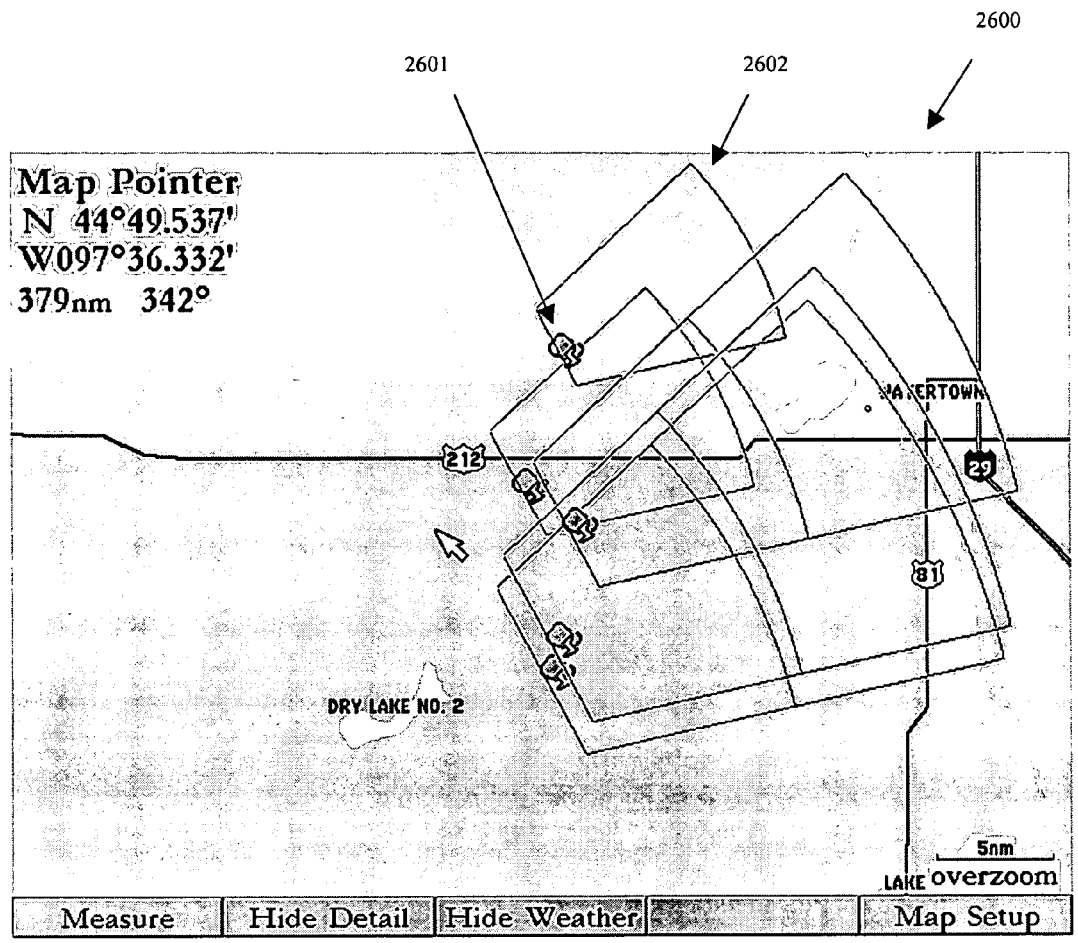
FIG. 26 is an example diagram of a display presentation for displaying real-time weather conditions, according to an example embodiment.

FIG. 26 is an example diagram of a display presentation 2600 for displaying real-time weather conditions, according to an example embodiment. FIG. 26 is presented for purposes of illustration only and is not intended to limit the embodiments of the invention.

The display presentation 2600 depicts a plurality of storm cells, each shown with a storm cell icon 2601 and storm cell box 2602. The storm cell icon 2601 preferably comprises a lightning bolt icon overlaid on a cloud icon. The storm cell box 2602 is displayed in a unique color or combination of colors, such as red with a white halo.

Figure 27:
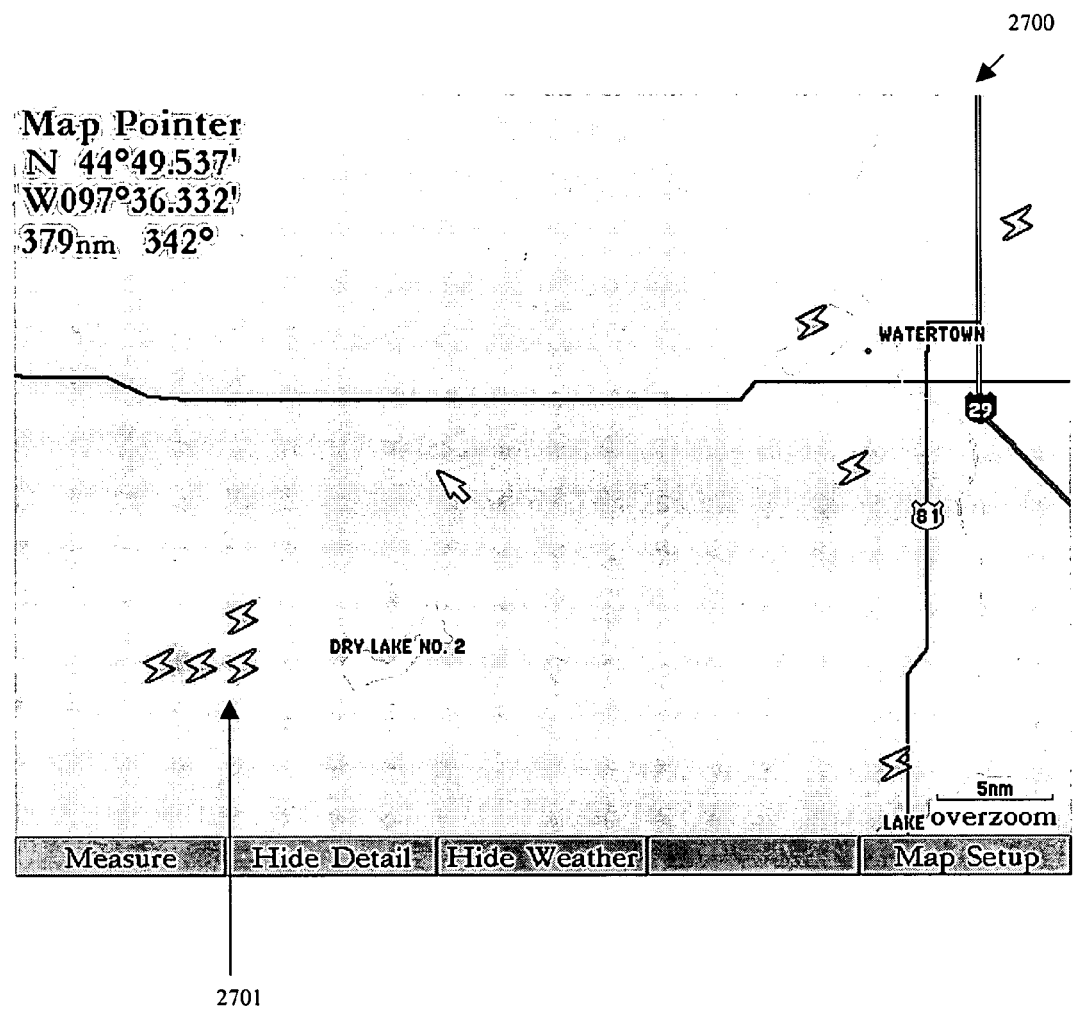
FIG. 27 is an example diagram of another display presentation for displaying real-time weather conditions, according to an example embodiment.

FIG. 27 is an example diagram of a display presentation 2700 for displaying real-time weather conditions, according to an example embodiment. FIG. 27 is presented for purposes of illustration only and is not intended to limit the embodiments of the invention.

The display presentation 2700 depicts lightning strikes using a plurality of lighting icons 2701. Each lighting icon 2701 is displayed as a lighting bolt having a color fading from light yellow to dark yellow, a black perimeter, and a white halo.

The method may also be used to present aviation related weather data, such as Meteorological Aviation Reports (METARs). Graphical METAR data may include ceilings, visibility, temperature to dewpoint spread, and surface winds at a reporting location, such as an airport. Such graphical METAR data may be overlaid on top of other types of weather and/or map data. Furthermore, the graphical METAR data may be hidden until a user pans over the reporting location or the reporting location is selected.

Figure 28:
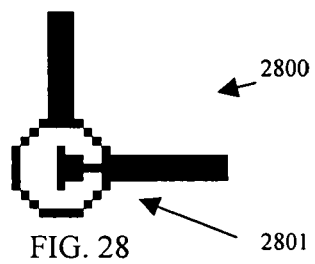
FIG. 28 is an example diagram of another display presentation for displaying real-time weather conditions, according to an example embodiment.

FIG. 28 is an example diagram of a display presentation 2800 for displaying real-time weather conditions, according to an example embodiment. FIG. 28 is presented for purposes of illustration only and is not intended to limit the embodiments of the invention.

The display presentation 2800 depicts a ceiling and visibility icon 2801. The ceiling and visibility icon 2801 preferably comprises a circle with a triangle located therein. A vertical bar preferably extends above the circle according to a ceiling at that location. Similarly, a horizontal bar preferably extends from the circle according to a visibility at that location. The ceiling and visibility icon 2801 is displayed in a unique color or combination of colors, such as green.

Figure 29:
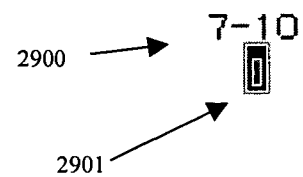
FIG. 29 is an example diagram of another display presentation for displaying real-time weather conditions, according to an example embodiment.

FIG. 29 is an example diagram of a display presentation 2900 for displaying real-time weather conditions, according to an example embodiment. FIG. 29 is presented for purposes of illustration only and is not intended to limit the embodiments of the invention.

The display presentation 2900 depicts a temperature to dewpoint spread icon 2901. The temperature to dewpoint spread icon 2901 preferably comprises numerals over a box with a bar located therein. The temperature to dewpoint spread icon 2901 is displayed in a unique color or combination of colors, such as a black box with a blue halo and green bar and numerals.

Figure 30:
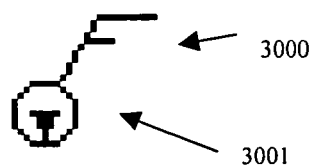
FIG. 30 is an example diagram of another display presentation for displaying real-time weather conditions, according to an example embodiment.

FIG. 30 is an example diagram of a display presentation 3000 for displaying real-time weather conditions, according to an example embodiment. FIG. 30 is presented for purposes of illustration only and is not intended to limit the embodiments of the invention.

The display presentation 3000 depicts a surface wind icon 3001. The surface wind icon 3001 preferably comprises a circle with a triangle located therein and a standard wind symbol extending therefrom. The surface wind icon 3001 is displayed in a unique color or combination of colors, such as green.

In a preferred embodiment, storm cells are depicted by a storm cell icon 2501 comprising a lightning icon 2701 overlaid on a cloud icon and a red storm cell box 2502 with a white halo. In the preferred embodiment, the lighting icon 2701 is displayed as a lighting bolt having a color fading from light yellow to dark yellow, a black perimeter, and a white halo. In the preferred embodiment, wind speed and direction is displayed using standard symbols shown in red. In the preferred embodiment, barometric pressure is displayed using a red line with a white halo. In the preferred embodiment, visibility is displayed using a yellow line with a black halo. In the preferred embodiment, water surface temperature is displayed using a blue line with a white halo. In the preferred embodiment, wave height is displayed using a purple line with a white halo. In the preferred embodiment, wave period is displayed using a green line with a white halo. In the preferred embodiment, wave direction is displayed using red arrows. The preferred color combinations allow a user to easily recognize and readily interpret multiple weather conditions simultaneously.

However, a user may be provided with an ability to alter one or more of the color combinations, in order to accommodate personal preferences or limitations. For example, the user may have some form of color blindness and may therefore need to utilize different color combinations to achieve the desired ease of recognition and interpretation of the weather conditions.

FIGS. 12-30 were presented to illustrate how distinctive visual features may be used to present real-time weather and water conditions on a display. A variety of other combinations and arrangements may be achieved and deployed without departing from the teachings presented herein. All such arrangements and configurations are intended to fall within the generous scope of this invention.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A navigation device, comprising:
a display, the display operable to present:
a first selectable icon adapted to be associated with a first real-time weather characteristic; and
a second selectable icon adapted to be associated with a second real-time weather characteristic, wherein the first and second icons are adapted to be dynamically and concurrently presented within the display of the navigation device along with the first and second real-time weather characteristics, and map data, wherein the map data is adapted to include a route for the navigation device, a current position for the navigation device, and a configurable amount of data associated with a geographical space that surrounds the route,
wherein the at least one of the selectable icons is adapted to appear as a symbol within presentations of the display and the symbol is adapted to appear as portions of the first or second weather characteristic.

2. The navigation device of claim 1, wherein at least one of the selectable icons is adapted to be associated with a display attribute function and adapted to be selected in order to alter presentations within the display.

3. The navigation device of claim 2, wherein the at least one of the selectable icons is adapted to call a real-time weather service when selected in order to update data associated with the first or second weather characteristic.

4. The navigation device of claim 2, wherein the at least one of the selectable icons is adapted to alter an arrangement or an appearance of the first or second weather characteristic.

5. A navigation device, comprising:
a display, the display operable to present:
a first selectable icon adapted to be associated with a first real-time weather characteristic; and
a second selectable icon adapted to be associated with a second real-time weather characteristic, wherein the first and second icons are adapted to be dynamically and concurrently presented within the display of the navigation device along with the first and second real-time weather characteristics, and map data, wherein the map data is adapted to include a route for the navigation device, a current position for the navigation device, and a configurable amount of data associated with a geographical space that surrounds the route,
wherein the at least one of the selectable icons is adapted to call a real-time weather service when selected in order to update data associated with the first or second weather characteristic.

* * * * *